United States Patent
Ono et al.

(10) Patent No.: US 12,405,224 B2
(45) Date of Patent: Sep. 2, 2025

(54) SURFACE INSPECTION DEVICE, SURFACE INSPECTION METHOD, METHOD OF MANUFACTURING STEEL MATERIAL, METHOD OF MANAGING QUALITY OF STEEL MATERIAL, AND MANUFACTURING FACILITY FOR STEEL MATERIAL

(71) Applicant: JFE Steel Corporation, Tokyo (JP)

(72) Inventors: Hiroaki Ono, Tokyo (JP); Daisuke Tajiri, Tokyo (JP); Keisuke Yoshida, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 327 days.

(21) Appl. No.: 17/792,212

(22) PCT Filed: Jan. 14, 2021

(86) PCT No.: PCT/JP2021/001089
§ 371 (c)(1),
(2) Date: Jul. 12, 2022

(87) PCT Pub. No.: WO2021/149588
PCT Pub. Date: Jul. 29, 2021

(65) Prior Publication Data
US 2023/0055315 A1     Feb. 23, 2023

(30) Foreign Application Priority Data
Jan. 20, 2020    (JP) .................... 2020-006687

(51) Int. Cl.
*G01N 21/892* (2006.01)
*G01N 21/89* (2006.01)
*G01N 21/88* (2006.01)

(52) U.S. Cl.
CPC ........ *G01N 21/892* (2013.01); *G01N 21/8901* (2013.01); *G01N 2021/8854* (2013.01)

(58) Field of Classification Search
CPC ............ G01N 21/892; G01N 21/8901; G01N 2021/8854; G01N 21/8921; G01N 2021/8918; Y02P 90/30
See application file for complete search history.

(56) References Cited

U.S. PATENT DOCUMENTS 10,705,027 B2    7/2020   Ono et al.
2014/0152794 A1*   6/2014   Takahashi .......... G01B 11/2531
                                                                                     348/79

(Continued)

FOREIGN PATENT DOCUMENTS

CN        204074543 U     1/2015
CN        105849534 A     8/2016

(Continued)

OTHER PUBLICATIONS

Yun, Jong Pil, et al. "Vision-based surface defect inspection for thick steel plates." Optical Engineering 56.5 (2017): 053108-053108. (Year: 2017) https://www.spiedigitallibrary.org/journals/optical-engineering/volume-56/issue-5/053108/Vision-based-surface-defect-inspection-for-thick-steel-plates/10.1117/1.OE.56.5.053108.full (Year: 2017).*

(Continued)

*Primary Examiner* — Wesley J Tucker
*Assistant Examiner* — Han Hoang
(74) *Attorney, Agent, or Firm* — Buchanan Ingersoll & Rooney PC

(57) ABSTRACT

A surface inspection method includes: an irradiating step of emitting oblique illumination light onto an inspection target region of steel material using two or more oblique line light sources; an imaging step of receiving each of reflected light beams of the oblique illumination light from the respective oblique line light sources, the reflected light beams being from the inspection target region, and capturing images of the inspection target region, by one or more line sensors; and (Continued)

a detecting step of detecting a linear surface defect at the inspection target region using the images captured at the imaging step, wherein orthographic projections of at least two oblique illumination light beams, out of the oblique illumination light from the two or more oblique line light sources, onto a surface of the steel material are orthogonal to each other on the inspection target region.

14 Claims, 12 Drawing Sheets

(56) References Cited

U.S. PATENT DOCUMENTS

| | | | |
|---|---|---|---|
| 2016/0266050 A1 | 9/2016 | Toyoda | |
| 2019/0003987 A1* | 1/2019 | Fukui | G01N 21/8914 |
| 2021/0027440 A1* | 1/2021 | Sakuyama | G01N 21/9515 |
| 2021/0302324 A1* | 9/2021 | Yoon | G01N 21/8851 |

FOREIGN PATENT DOCUMENTS

| | | |
|---|---|---|
| CN | 105979695 A | 9/2016 |
| CN | 106767537 A | 5/2017 |
| EP | 0898163 A1 | 2/1999 |
| EP | 3315952 A1 | 5/2018 |
| JP | 02110356 A | 4/1990 |
| JP | 04294204 A | 10/1992 |
| JP | 07104131 A | 4/1995 |
| JP | 2004233189 A | 8/2004 |
| JP | 2006242866 A | 9/2006 |
| JP | 2008275424 A | 11/2008 |
| JP | 2008304306 A | 12/2008 |
| JP | 2010038759 A | 2/2010 |
| JP | 2015125089 A | 7/2015 |
| JP | 2017009523 A | 1/2017 |
| JP | 2018036175 A | 3/2018 |
| JP | 6447637 B2 | 1/2019 |
| JP | 2019039798 A | 3/2019 |
| JP | 2020139942 A | 9/2020 |
| KR | 20110078635 A | 7/2011 |
| WO | 9700439 A1 | 1/1997 |

OTHER PUBLICATIONS

Russian Office Action for Russian Application No. 2022122389, dated Jun. 6, 2023 with translation, 22 pages.
International Search Report and Written Opinion for International Application No. PCT/JP2021/001089, dated Mar. 30, 2021, 6 pages.
Taiwanese Search Report for Taiwanese Application No. 110102153, dated Jul. 29, 2021, 6 pages.
Taiwanese Search Report for Taiwanese Application No. 110102153, dated Mar. 23, 2022, 7 pages.
Extended European Search Report for European Application No. 21744432.2, dated Jan. 12, 2023, 10 pages.
Korean Office Action for Korean Application No. 10-2022-7027462, dated Apr. 8, 2024 with Concise Statement of Relevance of Office Action. (5 pages).
Office Action (The First Office Action) issued May 28, 2025, by the State Intellectual Property Office of People's Republic of China in corresponding Chinese Patent Application No. 202180008870.1 and an English translation with Concise explanation of relevance of the Office Action. (15 pages).
Office Action (Communication pursuant to Article 94(3) EPC) issued Jul. 2, 2025, by the European Patent Office in corresponding European Patent Application No. 21 744 432.2-1001. (9 pages).

* cited by examiner

FIG.8
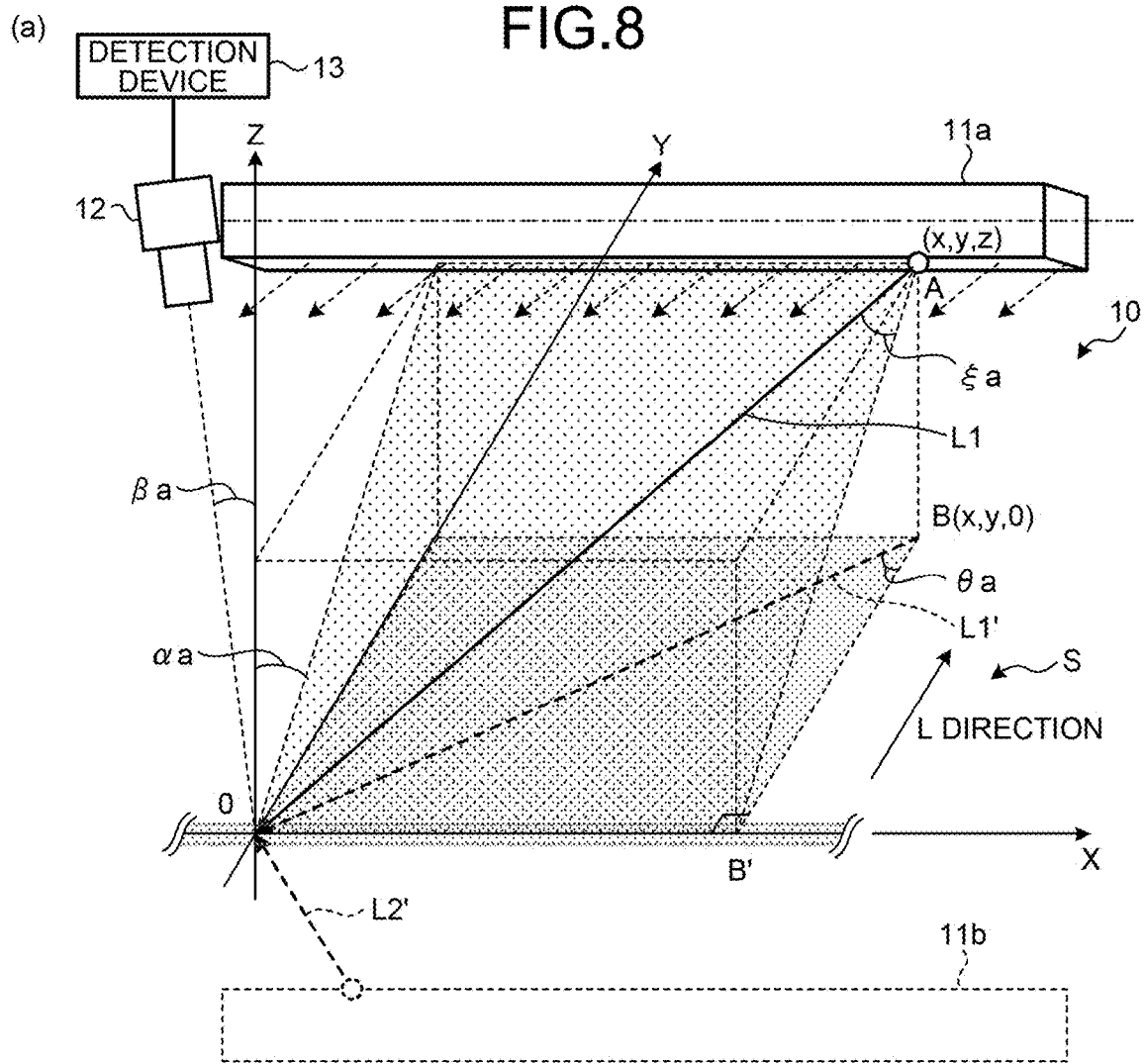
(a)
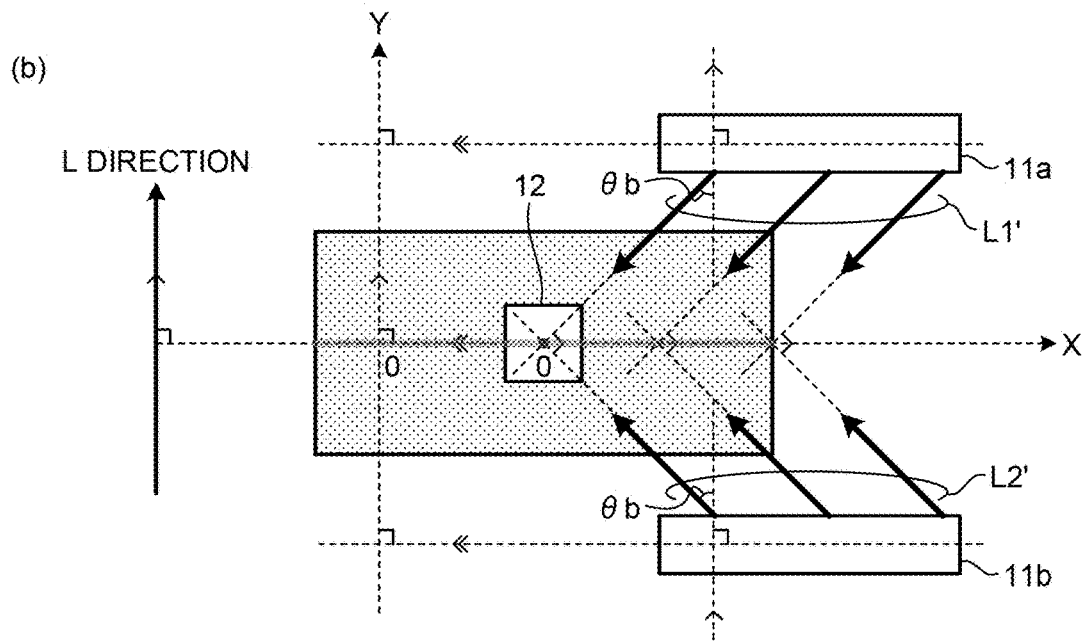
(b)

FIG.14
(a)
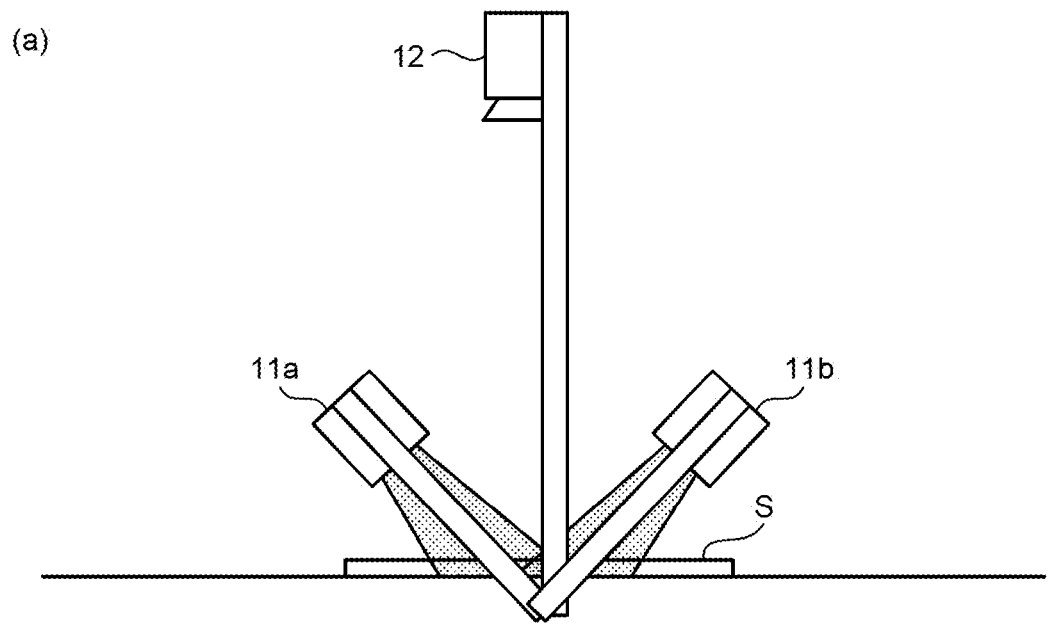
(b)
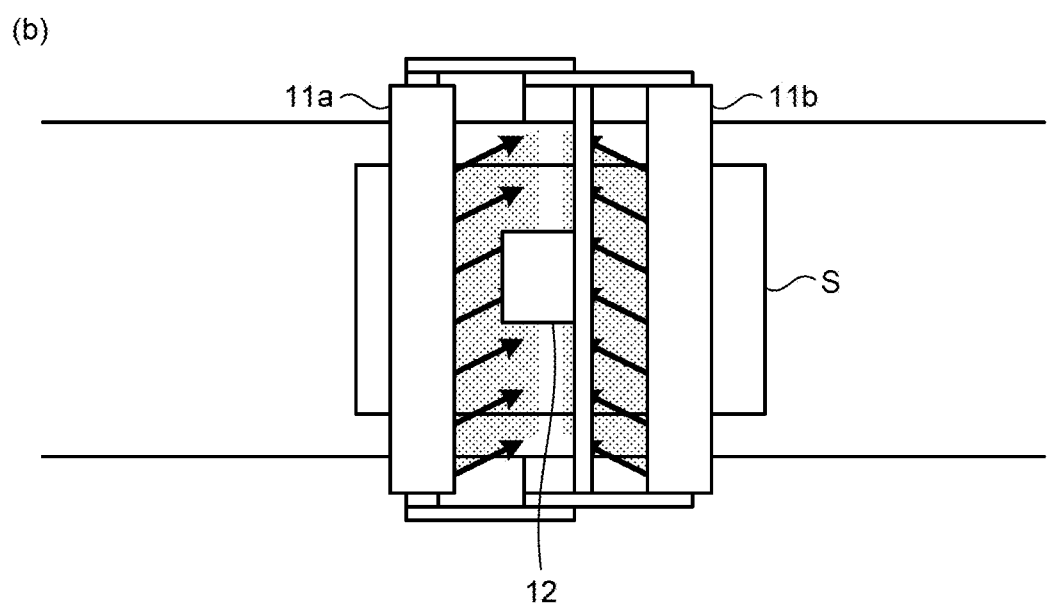

SURFACE INSPECTION DEVICE, SURFACE INSPECTION METHOD, METHOD OF MANUFACTURING STEEL MATERIAL, METHOD OF MANAGING QUALITY OF STEEL MATERIAL, AND MANUFACTURING FACILITY FOR STEEL MATERIAL

CROSS REFERENCE TO RELATED APPLICATIONS

This is the U.S. National Phase application of PCT/JP2021/001089, filed Jan. 14, 2021, which claims priority to Japanese Patent Application No. 2020-006687, filed Jan. 20, 2020, the disclosures of these applications being incorporated herein by reference in their entireties for all purposes.

FIELD OF THE INVENTION

The present invention relates to a surface inspection device, a surface inspection method, a method of manufacturing steel material, a method of managing quality of steel material, and a manufacturing facility for steel material.

BACKGROUND OF THE INVENTION

Surface quality assurance is extremely important in the production lines of steel products. For this reason, particularly in the field of steel sheets, in order to detect various types of surface defects, surface defect inspection has long been automated using a line light source and a line sensor (see Patent Literature 1). However, by simply emitting the illumination light beam along the longitudinal direction (transport direction of a steel sheet) using a line light source, it is difficult to detect a linear surface defect that is long in the longitudinal direction. Thus, in order to solve this problem, an oblique line light source for which the illumination light beam has a component in the width direction has been developed (see Patent Literature 2). In addition, Patent Literature 3 and 4 have also provided the methods of emitting illumination light beams from two directions using line light sources and receiving the reflected light beam of the corresponding illumination light beam for each of the reflected light beams using a line sensor to obtain a difference.

PATENT LITERATURE

Patent Literature 1: Japanese Patent Application Laid-open No. 2008-275424
Patent Literature 2: Japanese Patent Application Laid-open No. 2006-242866
Patent Literature 3: Japanese Patent Application Laid-open No. 2017-009523
Patent Literature 4: Japanese Patent Application Laid-open No. 2018-036175
Patent Literature 5: Japanese Patent Application Laid-open No. 2015-125089
Patent Literature 6: Japanese Patent No. 6447637

SUMMARY OF THE INVENTION

Among harmful defects to be detected on a steel sheet surface, there are defects that have a somewhat long and thin linear shape such as a roll flaw, and the major axis direction of which can be in any direction. However, as described above, the technique described in Patent Literature 1 is unable to detect a linear surface defect that is long in the longitudinal direction. In the technique described in Patent Literature 2, if the major axis direction of the surface defect matches the irradiation direction, the detection ability is significantly reduced. Moreover, the techniques described in Patent Literature 3 and 4 assume only the surface defects, the major axis direction of which is oriented in the width or longitudinal direction, as surface defects to be detected, and do not consider linear surface defects, the major axis direction of which can be in various directions.

Aspects of the present invention have been made in view of the above-described problems, and an object according to aspects of the present invention is to provide a surface inspection device and a surface inspection method capable of accurately detecting a linear surface defect, the major axis direction of which can be in any direction. Another object according to aspects of the present invention is to provide a method of manufacturing steel material, a method of managing quality of steel material, and a manufacturing facility for steel material capable of accurately detecting a linear surface defect, the major axis direction of which can be in any direction, and improving the manufacturing yield of steel material.

A surface inspection device according to aspects of the present invention includes: two or more oblique line light sources configured to emit oblique illumination light beams onto an inspection target region of steel material; one or more line sensors configured to receive each of reflected light beams of the oblique illumination light beam from the respective oblique line light sources, the reflected light beams being from the inspection target region for each oblique line light source, and to capture images; and a detection unit configured to detect a linear surface defect at the inspection target region using the images captured by the one or more line sensors, wherein orthographic projections of at least two oblique illumination light beams, out of the oblique illumination light beams from the two or more oblique line light sources, onto a surface of the steel material are orthogonal to each other on the inspection target region.

At least one oblique line light source out of the two or more oblique line light sources may be installed, within a field of view of the line sensors, on an upstream side in a transport direction or on a downstream side in the transport direction of the steel material with respect to the inspection target region.

At least one oblique line light source out of the two or more oblique line light sources may be installed, within a field of view of the line sensors, on an upstream side in a transport direction of the steel material with respect to the inspection target region, and at least one oblique line light source out of the two or more oblique line light sources may be installed, within the field of view of the line sensors, on a downstream side in the transport direction of the steel material with respect to the inspection target region.

A surface inspection method according to aspects of the present invention includes: an irradiating step of emitting oblique illumination light beams onto an inspection target region of steel material using two or more oblique line light sources; an imaging step of receiving each of reflected light beams of the oblique illumination light beams from the respective oblique line light sources, the reflected light beams being from the inspection target region for each oblique line light source, and capturing images of the inspection target region, by one or more line sensors; and a detecting step of detecting a linear surface defect at the inspection target region using the images captured at the imaging step, wherein orthographic projections of at least two oblique illumination light beams, out of the oblique illumination light beams from the two or more oblique line light sources, onto a surface of the steel material are orthogonal to each other on the inspection target region.

A method of manufacturing steel material according to aspects of the present invention includes a step of manufacturing steel material while detecting linear surface defects of the steel material using the surface inspection device according to aspects of the present invention.

A method of managing quality of steel material according to aspects of the present invention includes a step of managing quality of steel material by classifying steel material based on a presence or absence of linear surface defects using the surface inspection device according to aspects of the present invention.

A manufacturing facility for steel material according to aspects of the present invention includes: the surface inspection device according to aspects of the present invention; and the manufacturing facility for steel material, wherein the surface inspection device is configured to inspect a surface of steel material manufactured by the manufacturing facility for steel material.

According to the surface inspection device and the surface inspection method according to aspects of the present invention, it is possible to accurately detect a linear surface defect, the major axis direction of which can be in any direction. In addition, according to the method of manufacturing steel material, the method of managing quality of steel material, and the manufacturing facility for steel material according to aspects of the present invention, it is possible to accurately detect a linear surface defect, the major axis direction of which can be in any direction, and to improve the manufacturing yield of steel material.

BRIEF DESCRIPTION OF THE DRAWINGS

FIG. 8 is a schematic diagram illustrating the configuration of a surface inspection device that is one embodiment of the present invention.

FIG. 14 is a diagram illustrating an example of the arrangement position of the oblique line light sources illustrated in FIG. 11.

DETAILED DESCRIPTION OF EMBODIMENTS OF THE INVENTION

Principle

Figure 1:
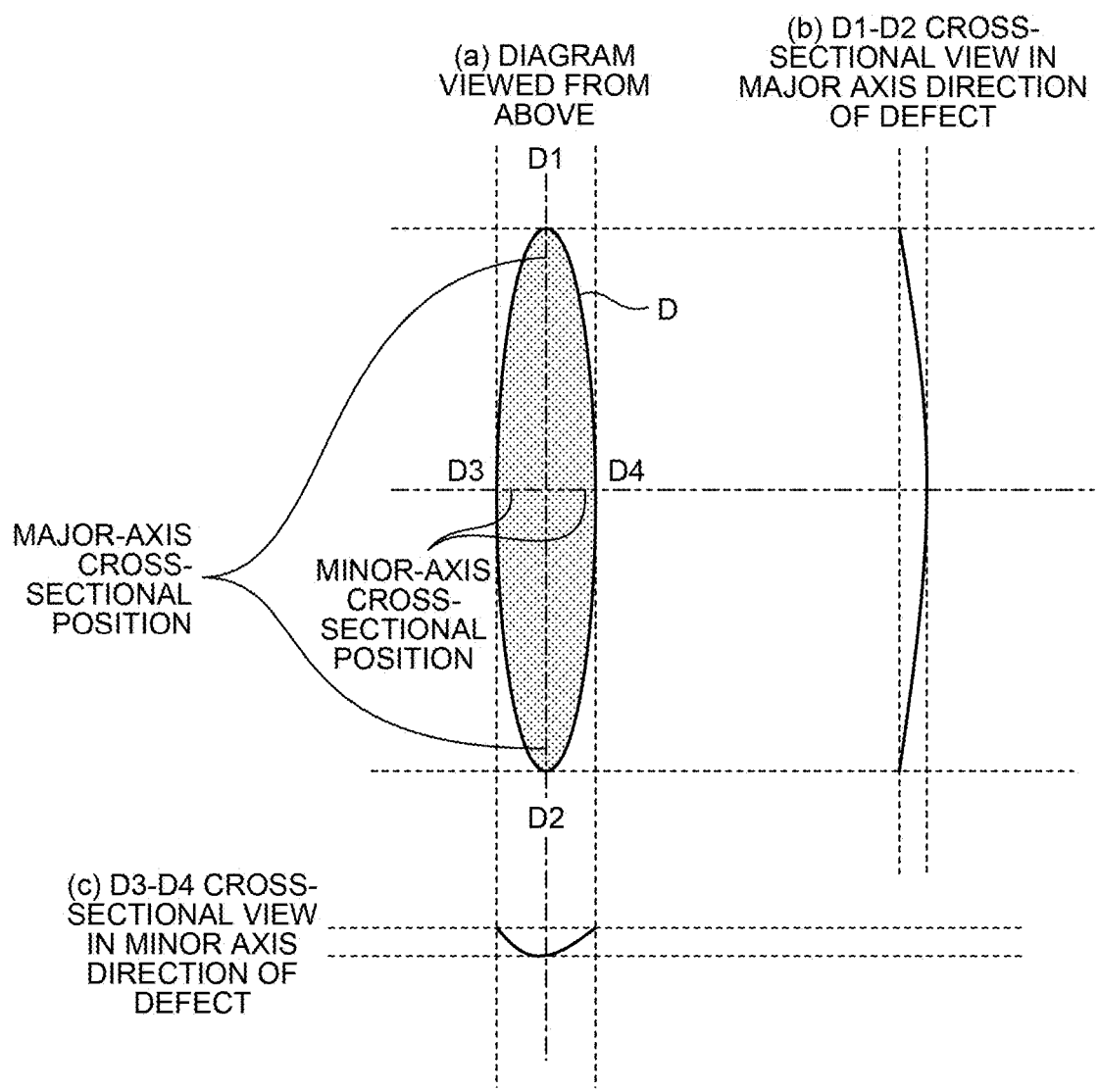
FIG. 1 is a diagram illustrating a cross-sectional shape of a linear surface defect.

First, the principle of a surface inspection device and a surface inspection method according to aspects of the present invention will be described.

According to Lambert's diffuse reflection model, when a slope is irradiated with the illumination light beam of light quantity I, the reflected light quantity $I_2$ of the illumination light beam from the slope is expressed by the following Expression (1). In Expression (1), r is the diffuse reflectance of the slope, L is the normalized vector extending from the slope toward the light source, and N is the normalized normal vector of the slope. As expressed in Expression (1), according to Lambert's diffuse reflection model, the reflected light quantity $I_2$ of the illumination light beam from the slope is proportional to the inner product (LN) of the normalized vector L extending from the slope toward the light source and the normalized normal vector N of the slope.

$$I_2 = r(L \cdot N)I \quad (1)$$

Therefore, based on the above-described Lambert's diffuse reflection model, when the illumination light beam is emitted from the major axis direction and the minor axis direction of a linear surface defect, the quantity of the reflected light beam at the major-axis cross-sectional position and the minor-axis cross-sectional position will be considered.

When the illumination light beam is emitted from the major axis direction of the linear surface defect, at the minor-axis cross-sectional position of the linear surface defect, the change direction of the normal vector of the slope with respect to the sound area is the direction orthogonal to the major axis direction that is the irradiation direction of the illumination light beam. Thus, the inner product (LN) of the normalized vector L extending from the slope toward the light source and the normalized normal vector N of the slope does not change much as compared with the sound area. Meanwhile, at the major-axis cross-sectional position of the linear surface defect, the change direction of the normal vector of the slope with respect to the sound area is the direction in parallel with the major axis direction that is the irradiation direction of the illumination light beam. Thus, the inner product (LN) significantly varies on both the front side and the back side in the irradiation direction of the illumination light beam. As a result, when the illumination light beam is emitted from the major axis direction of the linear surface defect, the intensity of the reflected light beam and the S/N ratio increase as the inclination of the slope at the major-axis cross-sectional position changes more significantly relative to the sound area. Meanwhile, when the illumination light beam is emitted from the minor axis direction of the linear surface defect, the intensity of the reflected light beam and the S/N ratio increase as the change in the inclination of the slope at the minor-axis cross-sectional position is greater relative to the sound area. It is assumed that the surface quality of the sound area is uniform and that the noise level is the same when the illumination light beam is emitted from the major axis direction and when the illumination light beam is emitted from the minor axis direction.

Figure 2:
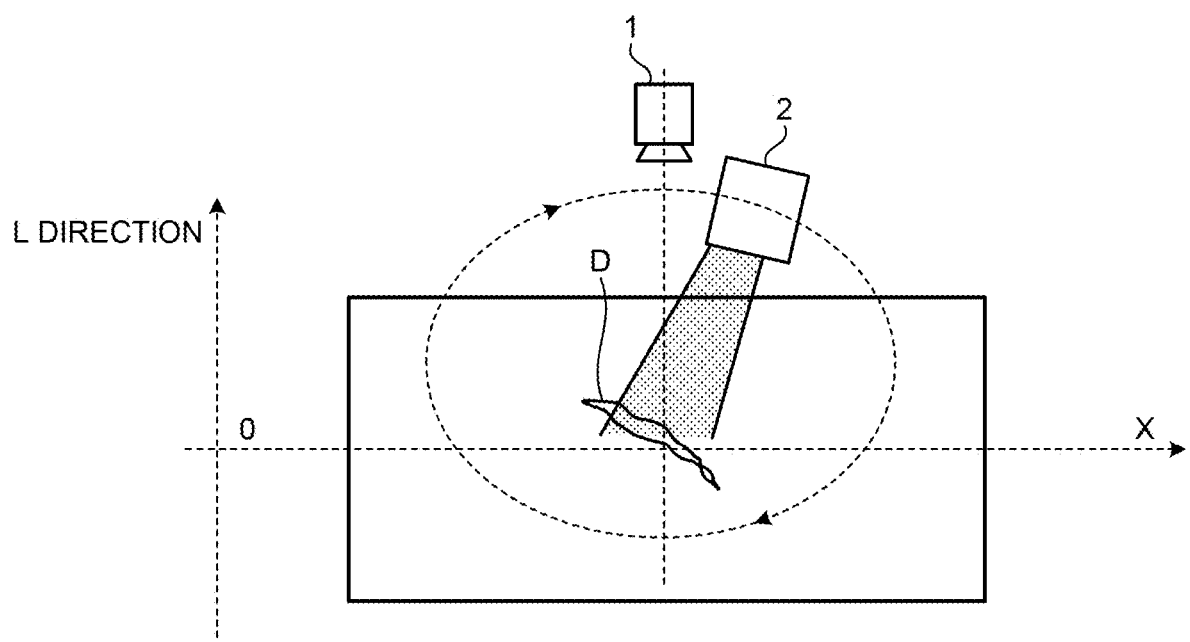
FIG. 2 is a diagram for explaining the irradiation direction of the illumination light beam with respect to the surface defect.
Figure 3:
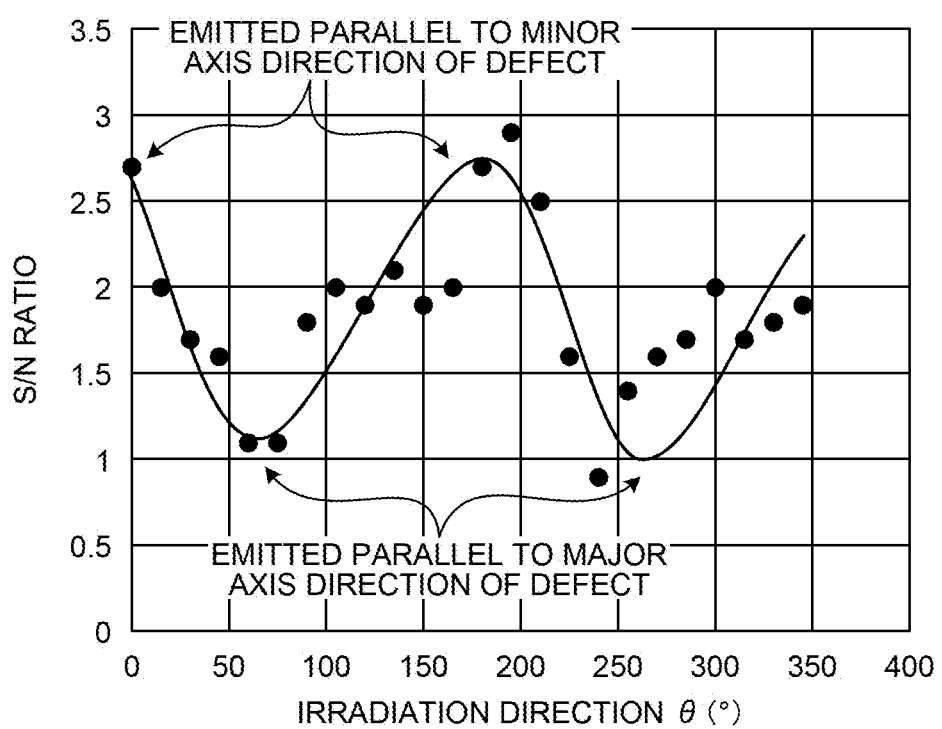
FIG. 3 is a graph illustrating an example of changes in the S/N ratio of the reflected light beam with respect to changes in the irradiation direction of the illumination light beam.

The cross-sectional shape of a linear surface defect is illustrated in FIG. 1. As illustrated in FIG. 1, the major-axis cross-section of the linear surface defect changes gently and the inclination of the slope is small relative to the sound area. Meanwhile, the minor-axis cross-section of the linear surface defect changes steeply and the inclination of the slope is large relative to the sound area. Therefore, the S/N ratio of the reflected light beam decreases as the irradiation direction of the illumination light beam comes closer to the major axis direction of the linear surface defect, and the S/N ratio of the reflected light beam increases as the irradiation direction of the illumination light beam comes closer to the minor axis direction of the linear surface defect. FIG. 3 illustrates the result of evaluating the S/N ratio of the reflected light beam by changing the irradiation direction of the illumination light beam, by placing, as illustrated in FIG. 2, an imaging unit 1 directly above a linear surface defect D and rotating a light source 2 in the horizontal plane along the broken line with the position of the linear surface defect D as the rotation center position. In FIG. 3, in the projecting portions with an S/N ratio of 2.5 or higher, the irradiation light is emitted in parallel with the minor axis direction of the linear surface defect. In the recessed portions near the S/N ratio of 1, the irradiation light is emitted in parallel with the major axis direction of the linear surface defect. As illustrated in FIG. 3, it can be confirmed that the S/N ratio of the reflected light beam changes periodically with respect to the irradiation direction of the illumination light beam. In FIG. 2, an L direction indicates the transport direction (longitudinal direction) of steel material, and an X direction indicates the width direction of the steel material.

Linear surface defects include those having major axis directions oriented in the same direction at all times and those having major axis directions oriented at random with respect to the transport direction of steel material. Examples of those having the major axis directions oriented in the same direction at all times include scratches and the like, and examples of those having the major axis directions oriented at random with respect to the transport direction of steel material include those that are caused by pushing an elongated foreign object in a random direction and the like. From the viewpoint of preventing the release of linear surface defects, it is preferable that the linear surface defects can be detected with a high S/N ratio regardless of which direction the major axis direction of the linear surface defect is oriented. In order to study an optical system that can stably detect linear surface defects regardless of which direction the major axis direction of the linear surface defect is oriented, the periodicity of the S/N ratio of the reflected light beam was approximated by a sinusoidal wave. The approximate expression $SN_{L1}$ representing the S/N ratio of the reflected light beams is expressed in the following Expression 2. In this case, it is assumed that the S/N ratio of the reflected light beam is $SN_{L1}$, the angle formed by the transport direction of the steel material and the direction of the linear surface defect is φ, the irradiation direction of the illumination light beam is θ, and certain constants are a and b. It is further assumed that the irradiation direction θ is 0° in the transport direction (L direction) of the steel material when orthographically projected onto the surface of the steel material.

$$SN_{L1} = a - b\cos(2(\varphi - \theta)) \tag{2}$$

Figure 4:
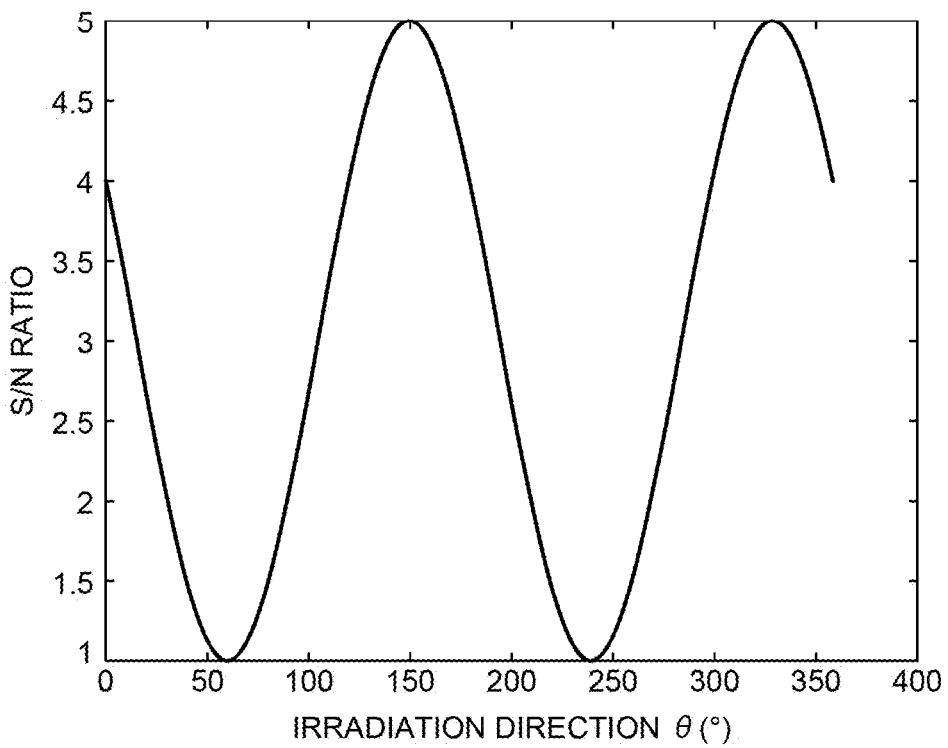
FIG. 4 is a graph illustrating an example of changes in the S/N ratio of the reflected light beam with respect to changes in the irradiation direction of the illumination light beam.
Figure 5:
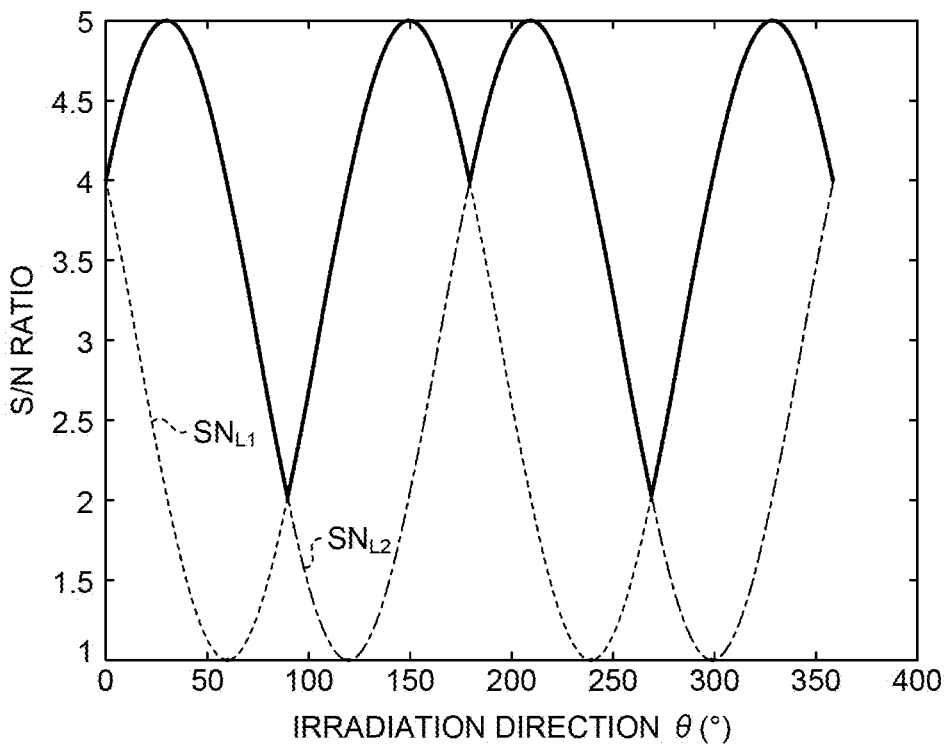
FIG. 5 is a graph illustrating an example of changes in the S/N ratios of the reflected light beams with respect to changes in the irradiation direction of the illumination light beams.

FIG. 4 illustrates, assuming that the angle φ formed by the transport direction of the steel material and the orientation of the linear surface defect is 60°, the constant a=3, and the constant b=2, the change in the irradiation direction θ of the illumination light beam and the change in the S/N ratio of the reflected light beam. The bold line in FIG. 4 represents the locus of the S/N ratio=3−2 cos(2(60°−θ)), and the unit of θ is ° (degrees). As illustrated in FIG. 4, simply emitting the illumination light beam from one direction inevitably causes the irradiation directions of the illumination light beam in which the S/N ratio of the reflected light beam is low. Therefore, if the illumination light beams are emitted from two directions and the reflected light beams of corresponding illumination light beams are imaged for each of the reflected light beams, at least one of the optical systems can be expected to have the reflected light beams with a high S/N ratio. Thus, by emitting the illumination light beams from two directions and imaging the reflected light beam of the corresponding illumination light beam for each reflected light beams, the change in the S/N ratios of two reflected light beams were examined and were illustrated in FIG. 5. The S/N ratio $SN_{L1}$ of the reflected light beam from one illumination light beam is expressed by Expression 2, and the S/N ratio $SN_{L2}$ of the reflected light beam from the other illumination light beams is expressed by the following Expression 3, and the angle φ that is formed by the transport direction of the steel material and the direction of the surface defect was set to 60°. In addition, Δθ in Expression 3 represents the angle that is formed by one and the other illumination light beams. In FIG. 5, the bold line represents the locus of the maximum value of the S/N ratio with respect to the two reflected light beams of the two respective illumination light beams.

$$SN_{L2} = a - b\cos(2(\varphi - (\theta + \Delta\theta))) \tag{3}$$

As illustrated in FIG. 5, in the range of irradiation direction θ=0 to 180°, it can be found that, out of the intersections of the broken line $SN_{L1}$ indicating Expression 2 and the alternate long and short dash line $SN_{L2}$ indicating Expression 3, one with a smaller irradiation direction θ assumes a minimum value of the S/N ratio. By setting up simultaneous equations of Expression 2 and Expression 3, the coordinates (θ, SN) of the intersection of the broken line $SN_{L1}$ and the alternate long and short dash line $SN_{L2}$ are obtained and are expressed as in the following Expression 4. In Expression 4, n is an integer value and SN is the S/N ratio component at the coordinates of the intersection.

$$(\theta, SN) = \left(\varphi - \frac{1}{2}\Delta\theta + \frac{n\pi}{2}, a - b\cos(\Delta\theta + n\pi)\right) \tag{4}$$

According to Expression 4, SN that is the S/N ratio component at the coordinates (θ, SN) of the intersection of the broken line $SN_{L1}$ and the alternate long and short dash line $SN_{L2}$ is a+b cos Δθ when n is an odd number and is a−b cos Δθ when n is an even number. That is, the smaller of the two assumes the lowest S/N ratio value in the irradiation in the two directions. Therefore, if Δθ that maximizes the function f(Δθ) indicated in the following Expression 5 is calculated, linear surface defects can be detected with a high S/N ratio regardless of which direction the major axis direction of the linear surface defect is oriented. The function f(Δθ) indicates the minimum value of the function a+b cos Δθ or the function a−b cos Δθ with respect to Δθ.

$$f(\Delta\theta)=\min(a-b \cos \Delta\theta, a+b \cos \Delta\theta) \quad (5)$$

Figure 6:
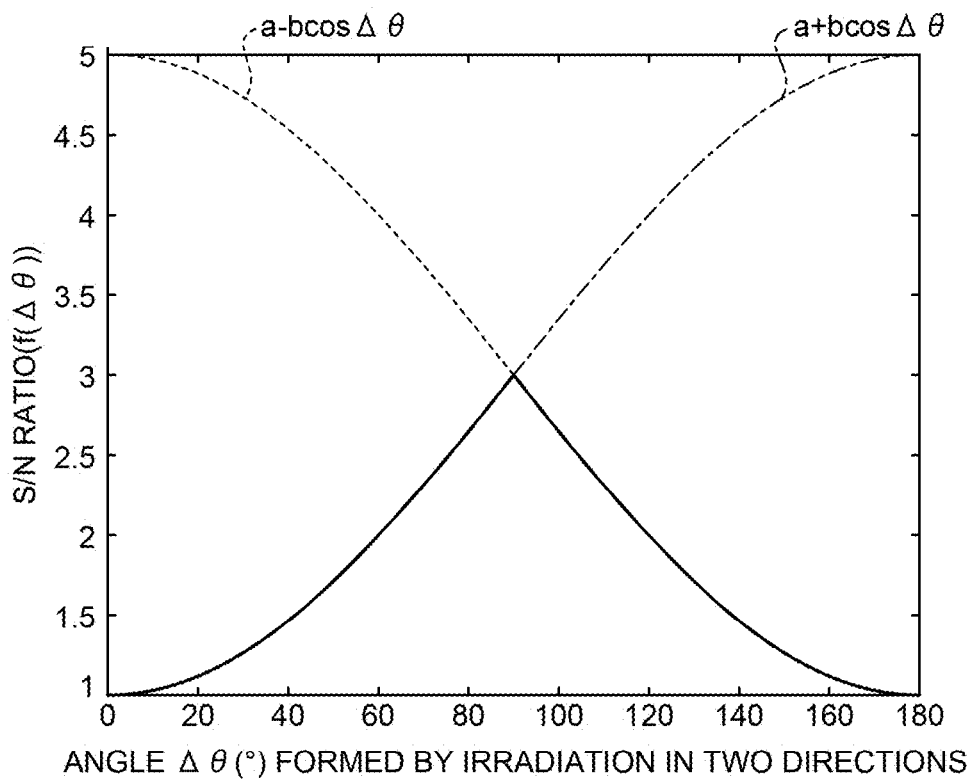
FIG. 6 is a graph illustrating an example of changes in the S/N ratio of the reflected light beams with respect to changes in the angle formed by one and the other illumination light beams.
Figure 7:
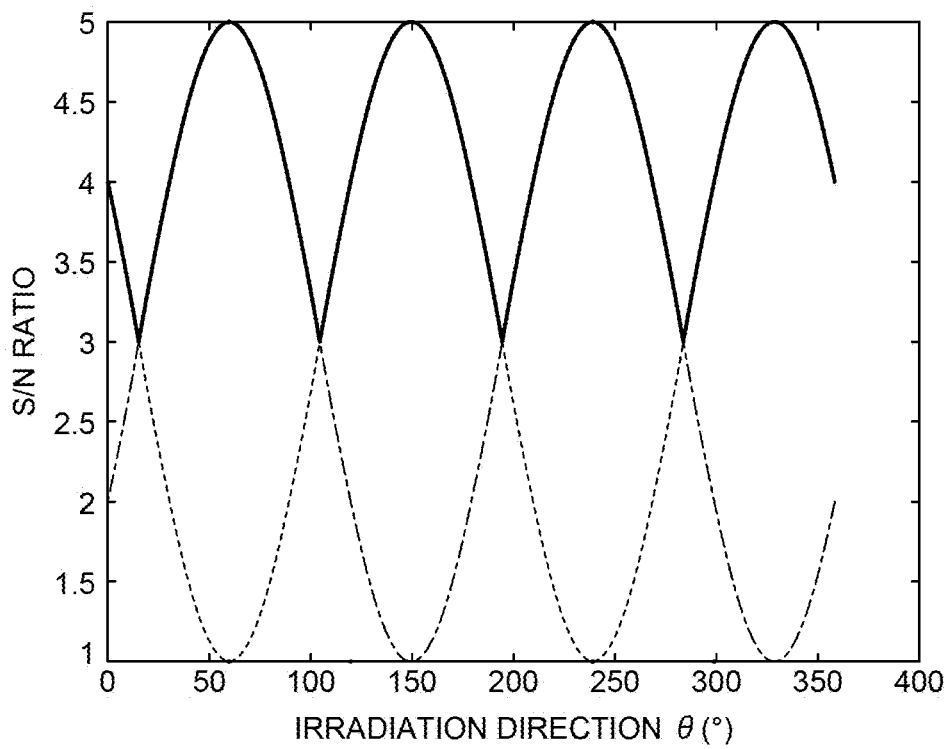
FIG. 7 is a graph illustrating an example of changes in the S/N ratio of the reflected light beams with respect to changes in the irradiation direction of the illumination light beams.

When the function f(Δθ) is indicated in the graph, it appears as the bold line in FIG. 6, and the Δθ that maximizes the function f(Δθ) is 90°. In FIG. 6, the broken line represents the locus of SN=a−b cos Δθ, and the alternate long and short dash line represents the locus of SN=a+b cos Δθ. The change in the S/N ratio of the reflected light beams with respect to the change in the irradiation direction θ of the illumination light beams, when Δθ is 90°, is indicated in FIG. 7. In FIG. 7, the broken lines represent the locus of SN=a−b cos θ, and the alternate long and short dash lines represent the locus of SN=a−b cos(θ−90°). The bold line in FIG. 7 represents the change in the maximum S/N ratio with respect to the two reflected light beams of the two respective illumination light beams. As illustrated in FIG. 7, by setting the light sources so that the irradiation direction of one illumination light beam and the irradiation direction of the other illumination light beam are orthogonal to each other, the S/N ratio of the reflected light beams can be made greater than the certain constant a (a=3 in the example illustrated in FIG. 7), regardless of which direction the major axis direction of the linear surface defect is oriented.

The above principle has been explained for the case of using two illumination light beams, but the same concept can also be applied to the case of using three or more illumination light beams. That is, even when three or more illumination light beams are used, by arranging the illumination light beams so that the irradiation directions of the illumination light beams are uniform, although detailed explanations are omitted, the reduction in the S/N ratio can be suppressed regardless of which direction the linear surface defect is oriented. For example, when three illumination light beams are used, it is preferable that the angle formed, in the orthographic projection onto the surface of steel material S, by the irradiation directions of the adjacent illumination light beams be 120 degrees on the inspection target region located on the surface of the steel material S. As the number of irradiation directions is higher, a higher S/N ratio can be ensured.

The following describes a surface inspection device that is one embodiment of the present invention that has been conceived on the basis of the principle of the above-described surface inspection device and the surface inspection method according to aspects of the present invention.

Overall Configuration

FIGS. 8(a) and 8(b) are schematic diagrams illustrating the configuration of the surface inspection device that is one embodiment of the present invention. As illustrated in FIGS. 8(a) and 8(b), a surface inspection device 10 that is one embodiment of the present invention is a device for detecting a linear surface defect, the major axis direction of which in any direction, formed on the surface of the steel material S, and includes an oblique line light source 11, a line sensor 12, and a detection unit 13. In this case, a line light source indicates a linear light source having a light-emitting surface that is long in one direction. Meanwhile, a line sensor indicates an imaging unit having a linear field of view. However, the line sensor in accordance with aspects of the present invention is not limited to only one line. For example, the case of using an area sensor having a two-dimensional field of view is also included in the "line sensor" in accordance with aspects of the present invention.

FIG. 8(a) illustrates the configuration of the surface inspection device viewed from obliquely above and FIG. 8(b) illustrates the same device viewed from directly above the steel material S, that is, the orthographic projection onto the surface of the steel material S. In FIGS. 8(a) and 8(b), the plane on which the surface of the steel material S and an inspection target region located on the surface of the steel material S are present is defined as an XY plane. In this case, the transport direction (L direction) of the steel material S is defined as the Y-axis. Meanwhile, on the surface of the steel material S, the direction that is perpendicular to the transport direction (L direction) is defined as the X-axis. When the steel material S is a steel sheet or a steel strip, the X-axis is the width direction of the steel material S. The normal direction with respect to the surface of the steel material S is defined as the Z-axis. The X-, Y-, and Z-axes have the origin 0 at the position where the imaging direction of the line sensor 12 and the inspection target region located on the surface of the steel material S intersect with each other. It is defined that the direction traveling toward the right side of the document is the positive side of the X-axis, the L direction of the steel material S is the positive side of the Y-axis, and the side on which the oblique line light source 11 is arranged is the positive side of the Z-axis. In FIG. 8(a), a point where a certain point A (referred to as a light-emitting point A, coordinates (x, y, z)) at the light-emitting position of oblique illumination light beam L1 is orthographically projected onto the XY plane is defined as a point B (coordinates (x, y, 0)), and a point where the point B is orthographically projected onto the X-axis is defined as a point B' (coordinates (x, 0, 0)). It is assumed that the inspection target region is a portion of the surface of the steel material S and is a line segment having a long straight line in the width direction (X direction) of the steel material S and having the same length as the width of the steel material S. In FIGS. 8(a) and 8(b), the inspection target region is indicated by a light gray line.

In the present embodiment, there are two oblique line light sources 11. Thus, in the following description, they will be described as oblique line light sources 11a and 11b. The oblique line light sources 11a and 11b emit the illumination light beams that, when the direction orthogonal to the axial direction of the light source is 0° and the axial direction of the light source is 90°, forms a certain angle larger than 0° but smaller than 90° as oblique illumination light beams onto the inspection target region of the steel material S. In the present embodiment, the oblique line light sources 11a and 11b are arranged so that the width direction (X direction) of the steel material S and the axial direction of the oblique line light sources 11a and 11b (the alternate long and short dash line in FIGS. 8(a) and 8(b)) are parallel to each other. That is, the axial direction of each of the oblique line light sources 11a and 11b is the X direction, and the longitudinal direction of the steel material S (Y direction, L direction, or the transport direction of the steel material S) and the axial direction of the oblique line light sources 11a and 11b intersect at right angles. In the present embodiment, the irradiation direction of the oblique illumination light beam from the oblique line light source 11a (broken line from oblique illumination light beam component L1' in FIG. 8(b)) and the irradiation direction of the oblique illumination light beam from the oblique line light source 11b (broken line from oblique illumination light beams component L2' in FIG. 8(b)) are orthogonal to each other on the inspection target region in the orthographic projection onto the surface of the steel material S. Specifically, the oblique illumination light beams components L1' and L2' that are obtained by orthographically projecting the oblique illumination light beam L1 from the oblique line light source 11a and oblique illumination light beam L2 from the oblique line light source 11b (not illustrated) onto the surface of the steel material S intersect at right angles on the inspection target region of the steel material S. More specifically, the oblique line light sources 11a and 11b are arranged so that both the oblique illumination light beams components L1' and L2' obtained by orthographically projecting the oblique illumination light beam L1 from the oblique line light source 11a and the oblique illumination light beam L2 from the oblique line light source 11b (not illustrated) onto the surface of the steel material S have an inclination of 45° with respect to the axial direction (X direction) of the light sources. In the case of FIGS. 8(a) and 8(b), the oblique line light sources 11a and 11b are arranged so that both the oblique illumination light beams components L1' and L2' have an inclination of 45° with respect to the transport direction (L direction) of the steel material S also. In this case, the oblique line light source 11a and the oblique line light source 11b have symmetric relations with respect to the XZ plane.

The angle parameters in FIGS. 8(a) and 8(b) will be described. In the oblique illumination light beam L from the oblique line light source 11, the angle formed by the oblique illumination light beam component orthographically projected onto the YZ plane and the normal line (that is, the Z-axis) with respect to the surface of the steel material S is defined as a light projection angle α. Specifically, in the oblique illumination light beam L1 from the oblique line light source 11a, the angle formed by the oblique illumination light beam component orthographically projected onto the YZ plane and the normal line (that is, the Z-axis) with respect to the surface of the steel material S is defined as a light projection angle αa. Similarly, in the oblique illumination light beam L2 (not illustrated) from the oblique line light source 11b, the angle formed by the oblique illumination light beam component orthographically projected onto the YZ plane and the normal line (that is, the Z-axis) with respect to the surface of the steel material S is defined as a light projection angle αb (not illustrated). The light projection angles αa and αb are 0° on the Z-axis. In this case, the YZ plane is a plane having a normal line corresponding to the axial direction of the oblique line light source 11. The YZ plane is a plane having a normal line corresponding to the width direction of the steel material S.

The angle formed by the imaging direction of the line sensor 12 and the normal line (that is, the Z-axis) with respect to the surface of the steel material S is defined as a light-receiving angle β. At this time, the angle when the line sensor 12 is viewed from the oblique line light source 11a side is defined as a light-receiving angle βa. Meanwhile, the angle when the line sensor 12 is viewed from the oblique line light source 11b side is defined as a light-receiving angle βb (not illustrated). As illustrated in FIG. 8, there is only one line sensor 12, so βa=−βb. The light-receiving angles β, βa, and βb also are 0° on the Z-axis. To facilitate understanding of the light-receiving angles β, βa, and βb, the line sensor 12 is illustrated with an angle from the Z-axis in FIG. 8(a) but is actually on the Z-axis as illustrated in FIG. 8(b).

In the oblique illumination light beam L (not illustrated) from the oblique line light source 11, the angle formed by the oblique illumination light beam component L' (not illustrated) orthographically projected onto the XY plane and the transport direction (that is, L direction or Y direction) of the steel material S is defined as an irradiation angle θ (not illustrated). More specifically, in the oblique illumination light beam L1 from the oblique line light source 11a, the angle formed by the oblique illumination light beam component L1' orthographically projected onto the XY plane and the transport direction (that is, L direction or Y direction) of the steel material S is defined as the irradiation angle θa. In FIG. 8(a), it is indicated as the angle between the broken line (that is, in parallel with the Y direction) orthogonal to the axial direction of the oblique line light source 11a and the oblique illumination light beam component L1'. Similarly, in the oblique illumination light beam L2 (not illustrated) from the oblique line light source 11b, the angle formed by the oblique illumination light beam component L2' orthographically projected onto the XY plane and the transport direction (that is, L direction or Y direction) of the steel material S is defined as the irradiation angle θb (not illustrated). It can also be indicated by the angle between the broken line orthogonal to the axial direction of the oblique line light source 11b (that is, in parallel with the Y direction) and the oblique illumination light beam component L2'. In FIG. 8(b), the illumination angle θa is indicated by the angle between the broken line orthogonal to the axial direction of the oblique line light source 11a (that is, in parallel with the Y direction) and the oblique illumination light beam component L1', and the illumination angle θb is indicated by the angle between the broken line orthogonal to the axial direction of the oblique line light source 11b (that is, in parallel with the Y direction) and the oblique illumination light beam component L2'. From the above description, it can be found that the irradiation angles θ, θa, and θb in FIGS. 8(a) and 8(b) and the irradiation angle θ in FIG. 2 through FIG. 7 are the same parameters. In the case of FIGS. 8(a) and 8(b), it is so arranged that the irradiation angles θa and θb of the oblique line light sources 11a and 11b, respectively, have an inclination of 45°.

In the oblique illumination light beam L from the oblique line light source 11, the angle expected by the oblique illumination light beam L, a certain light-emitting point, and the x coordinate of this light-emitting point is defined as an oblique light angle ξs. Specifically, in the oblique illumination light beam L1 from the oblique line light source 11a, the angle expected by the oblique illumination light beam L1, the certain light-emitting point A, and the point B' is defined as an oblique light angle ξa. Because the oblique light angle ξa is on a plane connecting the origin 0, the point B', the point A, and the coordinates (0, y, z), it is a parameter different from the above-described irradiation angles θ and θa. The oblique light angle ξa assumes 0° at the straight line connecting the point A and the point B'. Similarly, the same angle for the oblique line light source 11b and the oblique illumination light beam L2 (not illustrated) is defined as an oblique light angle ξb (not illustrated). Because the oblique line light sources 11a and 11b have symmetric relations with respect to the XZ plane, as with the oblique light angle ξa, it is a parameter different from the above-described irradiation angles θ and θb. The oblique light angle ξb assumes 0° at the straight line connecting the coordinates (x, −y, z) and the point B'.

In the present embodiment, the oblique illumination light beams are emitted from two directions using two oblique line light sources for convenience, but the oblique illumination light beams may be emitted from three or more directions. In other words, the surface inspection device according to aspects of the present invention includes two or more oblique line light sources that emit oblique illumination light beams onto the inspection target region of the steel material from two or more directions, one or more line sensors that receive each of reflected light beams of the oblique illumination light beams from the respective oblique line light sources, the reflected light beams being from the inspection target region, and capture images, and a detection unit that detects a linear surface defect at the inspection target region using the images captured by the one or more line sensors, and the orthographic projections of at least two oblique illumination light beams, out of the two or more oblique illumination light beams, onto the surface of the steel material are orthogonal to each other on the inspection target region.

In addition, the surface inspection method according to aspects of the present invention includes: an irradiating step of emitting oblique illumination light beams onto the inspection target region of the steel material from two or more directions using two or more oblique line light sources; an imaging step of receiving each of the reflected light beams of the oblique illumination light beams from the respective oblique line light sources, the reflected light beams being from the inspection target region, and capturing images of the inspection target region, by one or more line sensors; and a detecting step of detecting a linear surface defect at the inspection target region using the images captured at the imaging step, in which the orthographic projections of at least two oblique illumination light beams, out of the two or more oblique illumination light beams, onto the surface of the steel material are orthogonal to each other on the inspection target region.

When oblique illumination light beams are emitted from three or more directions, it needs to devise the arrangement and irradiation direction of the oblique line light sources. That is, because the oblique line light sources need to be installed on a production line so that each of the oblique illumination light beams does not interfere with each other, the irradiation directions of the oblique illumination light beams are uniform, and further, the field of view of the line sensors is ensured, the mechanism becomes complicated and that leads the equipment to be large. For example, when it is difficult to illuminate oblique illumination light beams at the same position with a plurality of light sources, there is a need to set up the inspection position and the visual field position for each irradiation direction at different positions in the transport direction of the steel material and to perform positioning in post-processing. Therefore, when actually installing low-cost and compact oblique line light sources on a production line, it is preferable that the oblique illumination light beams be emitted from two directions. Furthermore, because a smaller number of light sources and cameras is better from the viewpoint of device maintenance and maintainability and it is desirable that the mechanism be simple when performing cleaning and the like, it is preferable that two oblique line light sources be used. Moreover, it is most preferable to irradiate oblique illumination light beams from two directions with two oblique line light sources capable of achieving both.

Figure 9:
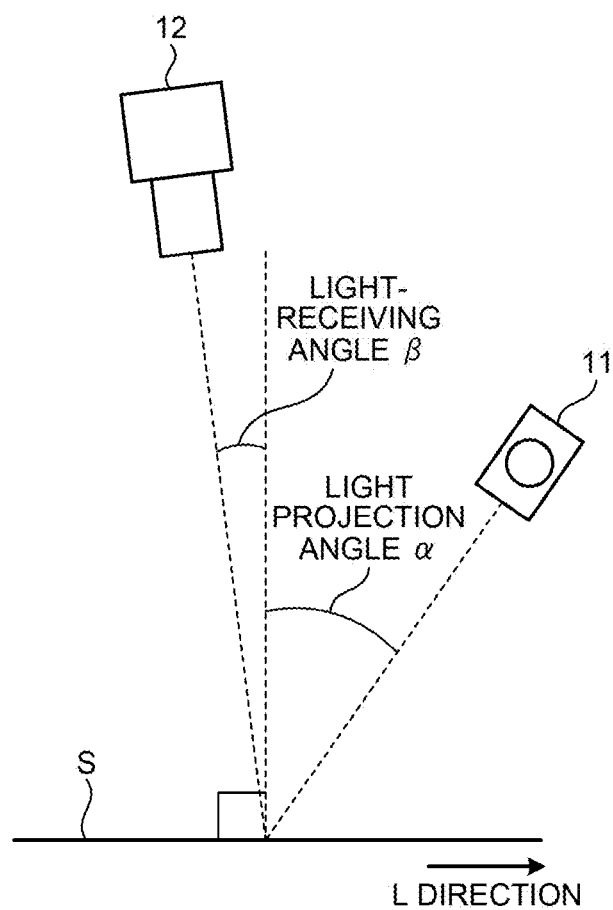
FIG. 9 is a diagram illustrating a light projection angle α of an oblique line light source and a light-receiving angle β of a line sensor.

The line sensor 12 captures images of the inspection target region of the steel material S that is irradiated with the oblique illumination light beams from the oblique line light sources 11a and 11b and outputs electrical signals indicating the captured images to the detection unit 13. In order to reduce the variation in detection ability due to the orientation of the major axis of a linear surface defect, it is most preferable that the relation between the light projection angle $\alpha$ of the oblique line light source 11 and the light-receiving angle $\beta$ of the line sensor 12 be as identical as possible in each irradiation direction. FIG. 9 illustrates the definitions of the light projection angle $\alpha$ of the oblique line light source 11 and the light-receiving angle $\beta$ of the line sensor 12. FIG. 9 is a diagram viewed from the axial direction of the oblique line light source 11. As illustrated in FIG. 9, the light projection angle $\alpha$ of the oblique line light source 11 is the angle formed by the irradiation direction of the oblique illumination light beam and the normal direction of the steel material S, in the orthographic projection onto the plane for which the axial direction of the oblique line light source 11 is the normal line. Similarly, the light-receiving angle $\beta$ of the line sensor 12 is the angle formed by the imaging direction and the normal direction of the steel material S, in the orthographic projection onto the plane for which the axial direction of the oblique line light source 11 is the normal line. The light-receiving angle $\beta$ is assumed to be a positive angle, when the line sensor 12 is viewed from the oblique line light source 11 side, in the direction away from the oblique line light source 11. Incidentally, the angle in the approaching direction is negative. In a more detailed description, the light projection angle $\alpha$ and the light-receiving angle $\beta$ are the same parameters as the light projection angles $\alpha a$ and $\alpha b$ and the light-receiving angles $\beta a$ and $\beta b$, respectively, in FIG. 8(a).

As the method of capturing images by separately receiving each of the reflected light beams of the oblique illumination light beams from two or more respective oblique line light sources, the reflected light beams being from the inspection target region, a method that uses oblique illumination light beams in different wavelength ranges can be exemplified. Specifically, a combination of a color line sensor and two or more oblique line light sources that emit respective oblique illumination light beams having wavelengths of different wavelength characteristics can be used. In this case, the oblique line light sources having different wavelength characteristics are arranged so that irradiation from two or more directions can be performed. As an example of wavelength characteristics of oblique illumination light beams, an oblique line light source of oblique illumination light beam having wavelength characteristics of red and an oblique line light source of oblique illumination light beam having wavelength characteristics of green are used, and images are captured by a color line sensor.

As another method, a method that uses the irradiation timings of an oblique illumination light beam from each of the oblique line light sources and the exposure timing of the line sensor can also be exemplified. Specifically, two or more oblique line light sources are blinked at different timings at high speed, and images are captured with the line sensor by matching the exposure timing of the line sensor to the irradiation by each of the oblique line light sources. Alternatively, out of the oblique illumination light beams from the oblique line light sources, the oblique illumination light beams from two or more respective directions are blinked at different timings at high speed, and the images are captured with the line sensor by matching the exposure timing of the line sensor to the irradiation by each oblique illumination light beam. When there are two oblique line light sources or when oblique illumination light beams are emitted from two directions, the emitted oblique illumination light beams blink alternately and at high speed. In this case, the wavelength characteristics of the oblique illumination light beams of the respective oblique line light sources only need to be one of being identical to each other, partially overlapping each other, or different from each other. Furthermore, in this case, the wavelength characteristics of the oblique illumination light beams in respective directions only need to be one of being identical to each other, partially overlapping each other, or different from each other. In either case, it is most preferable that the wavelength characteristics be different, in terms of separating the oblique illumination light beams of the two or more respective oblique line light sources or of the two or more respective directions. Both methods of receiving each of the reflected light beams can be implemented by combining known and unknown technologies (oblique line light sources, color line sensors, line sensors, synchronous control units for line sensors, and the like). Images obtained by the oblique illumination light beam of the respective oblique line light sources may be obtained separately for each of the reflected light beams by the above-described methods.

Moreover, by using oblique line light sources having linear polarization characteristics orthogonal to each other, images obtained by the oblique illumination light beam of the respective oblique line light sources may be obtained separately for each of the reflected light beams. Specifically, by installing one linear polarizing plate each in front of each of the two oblique line light sources at an angle γ° and an angle (γ+90)° (γ is a certain angle), only the light of the respective polarization components orthogonal to each other is allowed to transmit. In this case, a linear polarizing plate means a filter that transmits only the linear polarization components in a certain direction with respect to the incident light. In addition, linear polarizing plates having the same linear polarization characteristics as the linear polarizing plate may be installed on the line sensor at an angle γ° and an angle (γ+90°). At this time, a three-channel polarization camera having three line sensors from which images of polarization characteristics different from one another are obtained in one camera may be used. Furthermore, by using the same number of line sensors as the oblique line light sources, optical systems of respective irradiation directions may be installed at different locations.

The detection unit 13 detects linear surface defects from the images captured by the line sensor 12. Specifically, the detection unit 13 detects, after performing general shading correction processing and frequency filter processing on the image signals, surface defect signals by threshold processing. Then, the detection unit 13 determines linear surface defects based on the feature quantity and the like of the surface defect signal. The determined surface defect information is aggregated and used for quality assurance.

Examples of Oblique Line Light Source Arrangement

Figure 10:
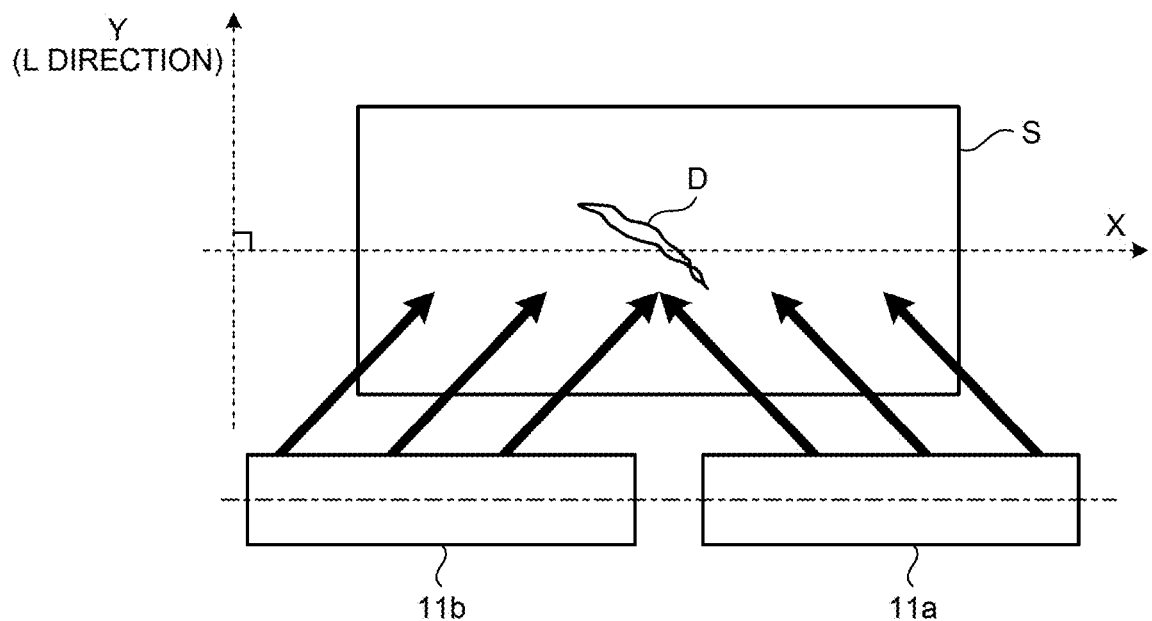
FIG. 10 is a diagram illustrating an example of the arrangement position of oblique line light sources.
Figure 11:
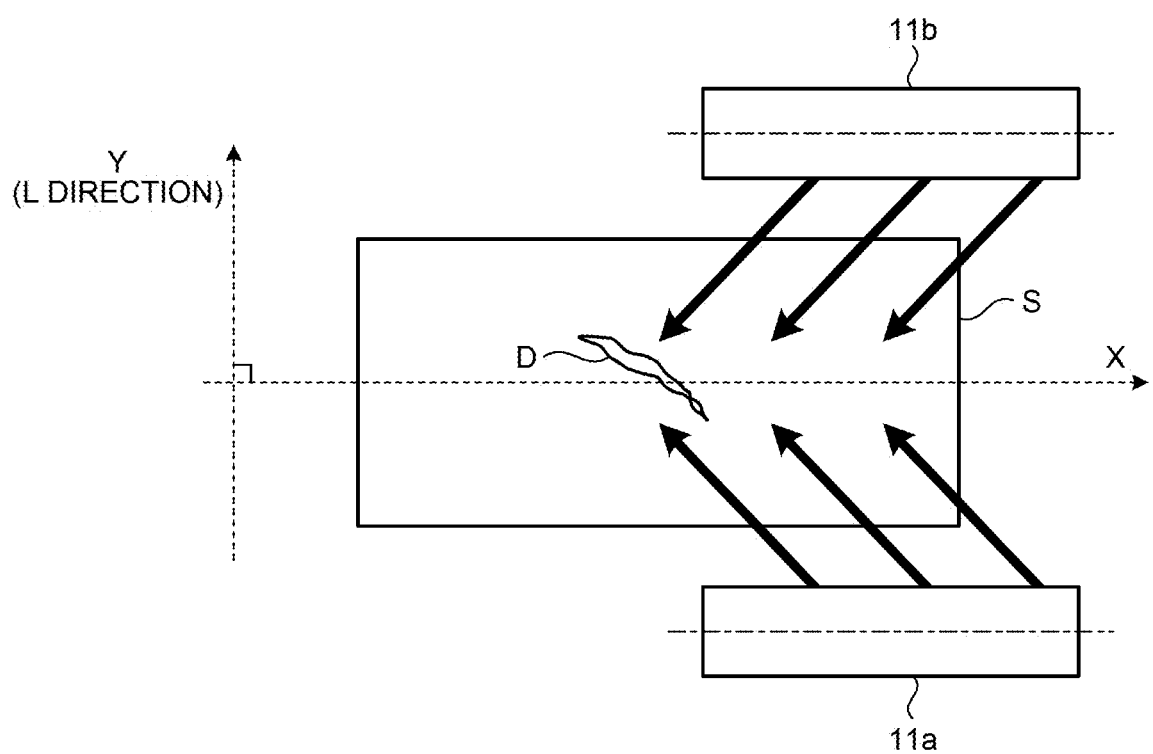
FIG. 11 is a diagram illustrating another example of the arrangement position of the oblique line light sources.

Two types of examples of arrangement of the oblique line light sources 11a and 11b will be described with reference to FIG. 10 and FIG. 11. Both FIG. 10 and FIG. 11 are diagrams viewed from above the steel material S, and the irradiation light indicated by thick arrows indicates the orthographic projection onto the surface of the steel material S. The irradiation direction of the oblique illumination light beam from the oblique line light source 11a and the irradiation direction of the oblique illumination light beam from the oblique line light source 11b are orthogonal to each other on the inspection target region in the orthographic projection onto the surface of steel material S. It is assumed that the width direction of the steel material S is the X-axis and the transport direction of the steel material S is the Y-axis. The L direction indicates the transport direction of the steel material S. The Y direction and the L direction are the same. The arrangement of the oblique line light sources 11a and 11b can take a pattern of arranging only on the upstream side or the downstream side in the L direction (arrangement A, upstream side in the L direction in the example illustrated in FIG. 10) as illustrated in FIG. 10 and a pattern of arranging on both the upstream side and the downstream side in the L direction (arrangement B) as illustrated in FIG. 11. In either case, the axial direction of the oblique line light source 11a and the axial direction of the oblique line light source 11b are arranged to intersect at right angles with the transport direction (L direction) of the steel material S and to be parallel to the width direction (X direction) of the steel material S. It is preferable that the line sensor 12 that receives the reflected light beams from the inspection target region be located on the X-axis. The arrangement A and the arrangement B will be described in more detail in the following.

First, in order to reduce the sensitivity difference due to the directionality of a linear surface defect, with respect to the light projection angle $\alpha a$ of the oblique line light source 11a in the orthographic projection onto the plane for which the axial direction of the oblique line light source 11a is the normal line, to the light-receiving angle $\beta a$ of the line sensor 12 in the orthographic projection onto the plane for which the axial direction of the oblique line light source 11a is the normal line, and to the light projection angle $\alpha b$ of the oblique line light source 11b and the light-receiving angle $\beta b$ of the line sensor 12 in the orthographic projection onto the plane for which the axial direction of the oblique line light source 11b is the normal line, it is most preferable that the conditions expressed in the following Expression 6 and Expression 7 be satisfied.

$$\alpha a = \alpha b \tag{6}$$

$$\beta a = \beta b \tag{7}$$

Next, when the conditions expressed in the above-described Expression 6 and Expression 7 are satisfied in the arrangements A and B, the further states of each arrangement will be described.

Figure 12:
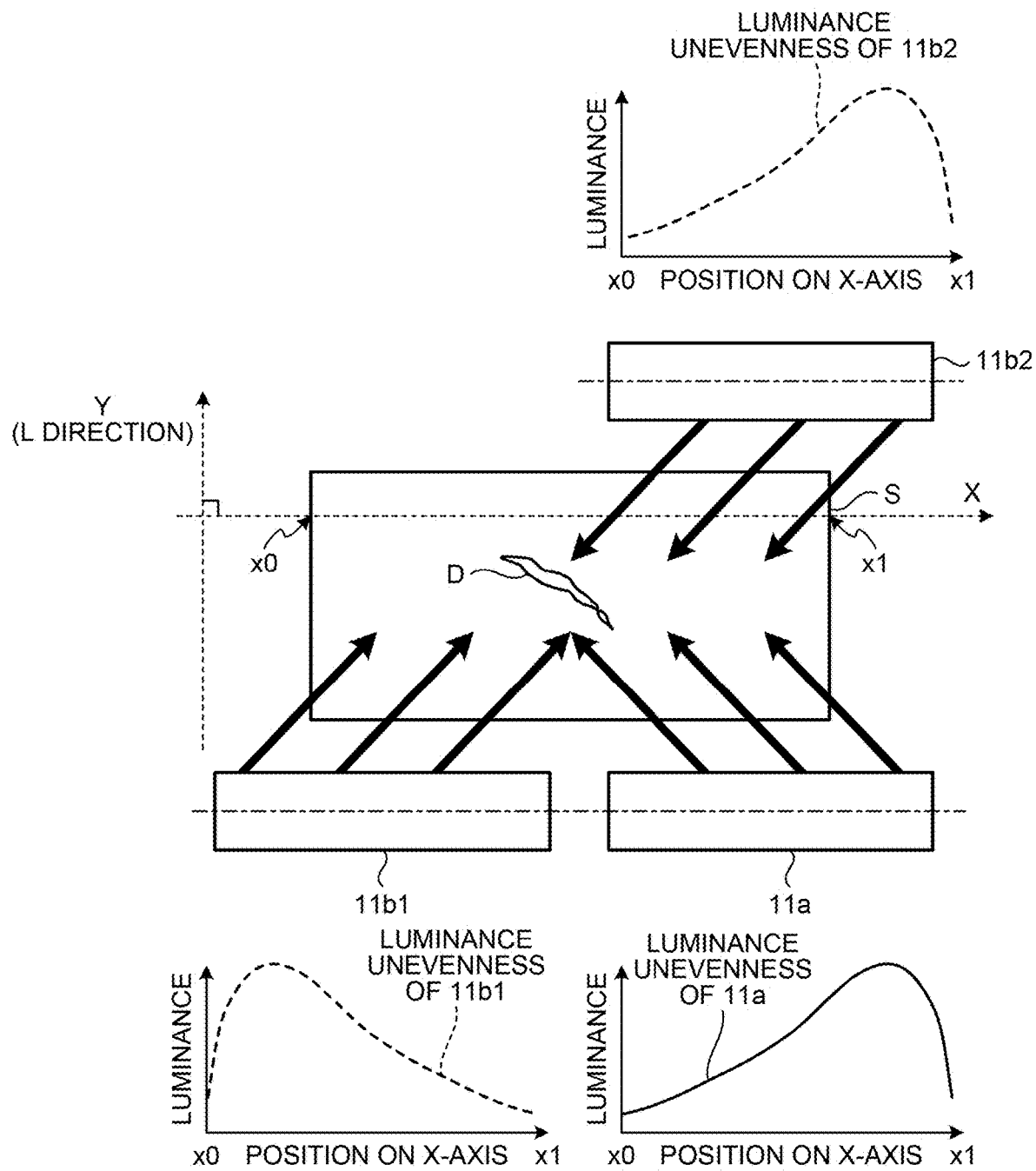
FIG. 12 is a diagram for explaining the luminance unevenness of the reflected light beams at the visual field position of the line sensor.

When considering the surface inspection using the arrangements A and B, the luminance unevenness of the reflected light beams may inevitably occur, due to oblique illumination, at the visual field position of the line sensor 12, that is, in the width direction of the field of view. FIG. 12 schematically illustrates the luminance unevenness received by the line sensor 12 with respect to the position of each of the oblique line light sources 11a, 11b1, and 11b2. The abscissa axis in FIG. 12 indicates the position in the width direction (X direction) on the surface of the steel material S, and the ordinate axis indicates the luminance of the line sensor 12. In FIG. 12, the width of the steel material S is from x0 to x1 on the X-axis. It is preferable that the luminance unevenness be reduced. In order to reduce such luminance unevenness of the reflected light beams, countermeasures of increasing the number of line sensors 12 in the width direction as much as possible or correcting the image signal and the like can be taken. Considering cost and maintainability, the most desirable is, before the threshold processing of the detection luminance needed for the surface defect detection, to perform shading correction that normalizes the detection luminance by the luminance of the sound area. The shading correction method for the luminance unevenness is different in the arrangements A and B. Specific methods will be individually described later.

In addition to the surface inspection device according to aspects of the present invention, by performing the surface inspection by adding signal information obtained under the regular reflection condition, improvement in the detection performance for the same linear surface defect can be expected. At this time, the restrictions of the optical system for setting the regular reflection condition are different in the arrangements A and B. The restrictions will also be individually described later.

The arrangement A will be further described. In the arrangement A, because one line sensor 12 discriminates the oblique illumination light beams in two directions, there are no restrictions on the light projection angles αa and αb of the oblique line light sources 11a and 11b and the light-receiving angles βa and Pb of the line sensor 12 to make the arrangement satisfy the conditions expressed in Expression 6 and Expression 7. As for the shading correction method, in the case of the arrangement A (that is, the oblique line light sources 11a and 11b1 are used), because the position where the luminance is high and the position where the luminance is low in the oblique line light sources 11a and 11b1 are reversed at both ends of the field of view of the line sensor 12, it is preferable that the shading correction processing be performed for each of the reflected light beams.

Figure 13:
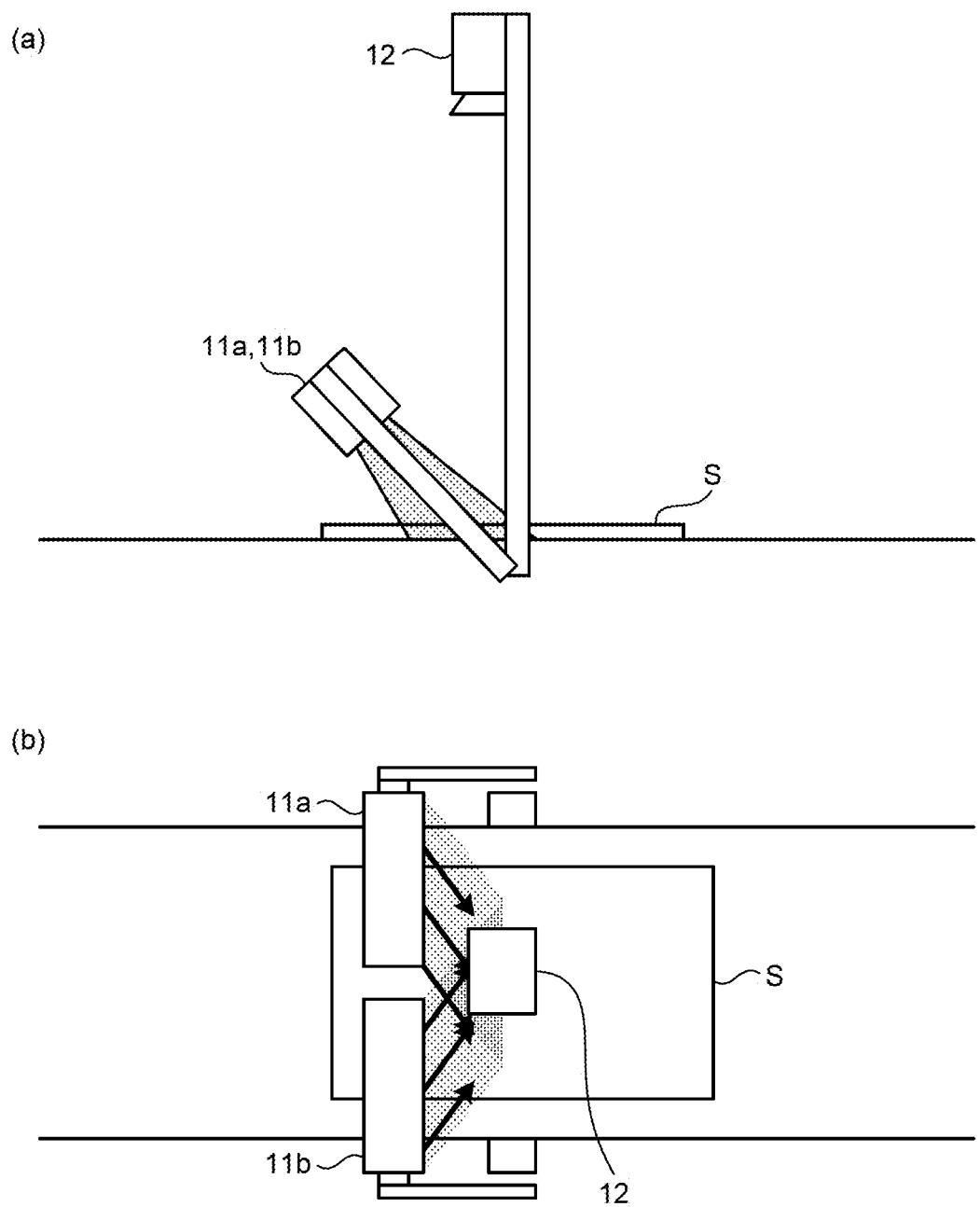
FIG. 13 is a diagram illustrating an example of the arrangement position of the oblique line light sources illustrated in FIG. 10.

A specific example of the arrangement A is illustrated in FIGS. 13(a) and 13(b). In this example, a combination of a color line sensor 12 and two oblique line light sources 11a and 11b that emit respective oblique illumination light beams having wavelengths of different wavelength characteristics will be described. In the arrangement illustrated in FIGS. 13(a) and 13(b), two-color oblique line light sources 11a and 11b are arranged on the upstream side in the transport direction of the steel material S. The oblique line light sources 11a and 11b can emit monochromatic light having different colors. The axial direction of the oblique line light source 11a and the axial direction of the oblique line light source 11b are substantially on the same line. Using these oblique line light sources 11a and 11b, oblique illumination light beams were emitted from two directions so that the orthographic projections of the oblique illumination light beams onto the surface of the steel material S were orthogonal to each other on the inspection target region. The reflected light beams from the inspection target region was then received by the color line sensor 12. The oblique line light sources 11a and 11b that are capable of irradiating in two directions in the width direction of the steel material S and for which the light projection angle αa and the light projection angle αb are identical were used in order to make the light projection and receiving angle conditions of the two sets of optical systems identical (that is, to satisfy the conditions expressed in Expression 6 and Expression 7). If the difference between the two sets of optical systems is allowed, the effect of this principle can be obtained to some extent even if the light projection angles αa and αb are slightly different. At this time, the color of the oblique illumination light beams were red for irradiation from one side and green for irradiation from the other side with respect to the width direction, and a color line sensor was used. Regarding the wavelength, this optical system is formed if the wavelength range of the oblique line light sources 11a and 11b and the spectral sensitivity characteristics of the color line sensor do not overlap with each other.

In this example, by the combination of the color line sensor and the oblique line light sources that emit respective oblique illumination light beams of different wavelengths, the reflected light beams of the oblique illumination light beams from the respective oblique line light sources were received for each of the reflected light beams, the reflected light beams being from the inspection target region, and images were captured, but it may be a combination of a line sensor and oblique line light sources that emit oblique illumination light beams having respective wavelength characteristics that are identical to each other, partially overlapping each other, or different from each other. In this case, the light emission timings of the oblique line light sources and the exposure timing of the line sensor are switched at high speed, and the irradiation timing and the exposure timing are matched.

A plurality of sets of oblique line light sources and line sensors may be installed in different locations. The light-receiving angles βa and βb of the color line sensor only need to select the optimum angle. If the angle is different from the light projection angles αa and αb, it is also possible to add a regular reflection condition. This is to deal with the linear surface defects that are most sensitive under the regular reflection condition, and by adding a blue normal line light source (having no irradiation component in the width direction), it is possible to acquire regular reflection images in the blue channel.

The optical system of the arrangement B will be further described. In the arrangement B, oblique illumination light beams are emitted from two directions of the upstream side and the downstream side in the L direction. At this time, if the line sensor 12 is inclined to either the upstream side or the downstream side with the same light-receiving angles βa and βb when the oblique illumination light beams in two directions is discriminated by one line sensor 12, one is located on the front side with respect to the oblique line light source and the other is located on the opposite side with respect to the oblique line light source. Therefore, it is most preferable that the line sensor 12 be installed directly above the steel material S with the light-receiving angles βa and βb set to 0°. In addition, in the case of the arrangement B (that is, the oblique line light source 11a and oblique line light source 11b2 are used), because the position where the luminance is high and the position where the luminance is low with the oblique line light sources 11a and 11b2 are the same, the shading correction processing may be performed by integrating the signals of a plurality of line sensors 12 by linear combination or the like.

A specific example of the arrangement B is illustrated in FIGS. 14(a) and 14(b). In this example, a combination of a color line sensor 12 and two oblique line light sources 11a and 11b that emit respective oblique illumination light beams having wavelengths of different wavelength characteristics will be described. In the arrangement illustrated in FIGS. 14(a) and 14(b), the oblique line light sources 11a and 11b were arranged so that the color of the illumination light beam on the upstream side in the transport direction is red and the color of the illumination light beam on the downstream side in the transport direction is green. Furthermore, using these oblique line light sources 11a and 11b, oblique illumination light beams were emitted from two directions so that the orthographic projection of the oblique illumination light beams onto the surface of the steel material S were orthogonal to each other on the inspection target region. The reflected light beams from the inspection target region was then received using the color line sensor 12. The color line sensor 12 was installed so that the light-receiving angles βa and βb are 0°, in order to make the light projection and receiving angle conditions of the two sets of optical systems identical (that is, in order to satisfy the conditions expressed in Expression 6 and Expression 7). If the difference between the two sets of optical systems is allowed, the effect of this principle can be obtained to some extent even if there is some deviation from directly above. At this time, it is recommended to adjust the oblique line light sources 11a and 11b on the upstream side in the transport direction and the downstream side in the transport direction so that the deviation of the two sets of optical systems (that is, the deviation of the light projection angles αa, αb and the deviation of the light-receiving angles βa, βb) is as small as possible. Note that, by changing the angle from directly above, it is also possible to obtain the effect that the regular reflection condition can be set.

In the present embodiment, the oblique illumination light beams components L1' and L2' were arranged to have an inclination of 45° with respect to the axial direction of the oblique line light sources when the oblique illumination light beams L1 and L2 of the oblique line light sources 11a and 11b are orthographically projected onto the surface of the steel material S, but when one oblique irradiation light has an inclination of w° with respect to the axial direction of the oblique line light source and the other oblique illumination light beam has an inclination of ψ° with respect to the axial direction of the oblique line light source, the same effect can be obtained if ω°+ψ°=90° (this expression can be derived from (90°−ω°)+(90°−ψ°)=90°) is true. However, because the respective differences at the light projection angle α and the light-receiving angle β in two or more optical systems can be small, and because the difference in detection performance due to changes in background noise and the like can reduce the luminance unevenness of the reflected light beams due to the oblique light angle being larger, it is most preferable that the oblique illumination light beams component have an inclination of 45° with respect to the axial direction of the oblique line light source.

Furthermore, in the present embodiment, an example in which the oblique line light sources 11a and 11b are arranged so that the transport direction (L direction) of the steel material S and the axial directions of the oblique line light sources 11a and 11b are at right angles to each other has been exemplified, but the present invention is not limited to that arrangement. If the irradiation direction of the oblique illumination light beam from the oblique line light source 11a and the irradiation direction of the oblique illumination light beam from the oblique line light source 11b are orthogonal to each other on the inspection target region in the orthographic projection onto the surface of the steel material S, then the effect according to aspects of the present invention can be obtained, even when the axial direction of each of the oblique line light sources 11a and 11b and the transport direction of the steel material S are not at right angles and the smaller angle has an angle equal to or smaller than a right angle (that is, 90°). In particular, if it is not possible to make a right angle due to problems of the layout of manufacturing equipment, the smaller angle may be less than a right angle to the extent where the effect of oblique illumination can be expected. Considering the effect of oblique illumination, the smaller angle formed by the axial direction of the oblique line light sources 11a and 11b and the transport direction of the steel material S is empirically preferable to be greater than or equal to 60° and is more preferable to be greater than or equal to 80°. As the arrangement of the oblique line light source, the form is more ideal as it is closer to 90°.

In the present embodiment, the line sensor 12 has been exemplified, but an area sensor may be used instead of the line sensor 12. When the area sensor is used, it is most desirable to extract and use only the linear field of view from the field of view of the area sensor. In the present embodiment, the case of a single line sensor 12 has been exemplified, but the reflected light beams from the respective light sources may be received using not only one but a plurality of line sensors 12. However, considering the accuracy of positioning and the like, it is most preferable to be a single line sensor. In the present embodiment, the inspection target region has been exemplified as a line, but the embodiment is not limited thereto. Needless to say, the inspection target region can be in the form of a point, line, or surface, depending on the field of view of the line sensor 12 or the area sensor. In the present embodiment, the case only with the optical system in which the oblique illumination light beams are emitted from two directions according to aspects of the present invention has been exemplified, but the present invention is not limited thereto. For example, by combining the above-described optical system in which the oblique illumination light beams are emitted from two directions with a completely different optical system such as a regular reflection optical system, the inspection of the same linear surface defects that aspects of the present invention were designed to inspect may be performed.

Figure 15:
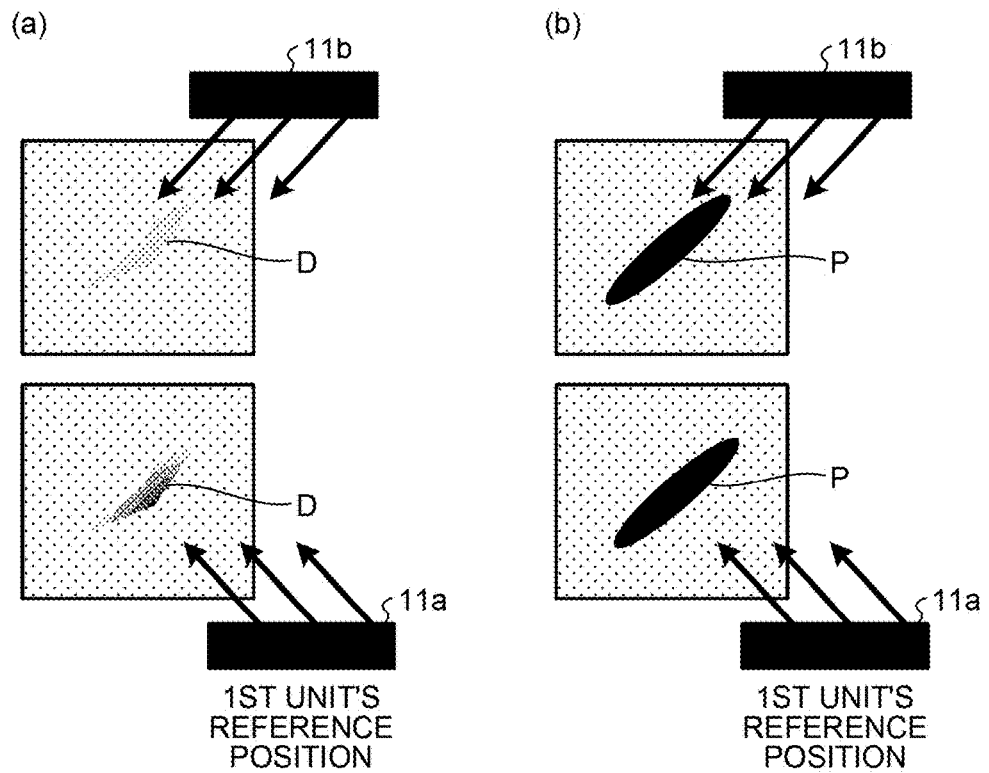
FIG. 15 is a diagram for explaining images obtained by emitting each of the oblique illumination light beams from two directions onto a linear surface defect having irregularities and onto a harmless pattern having an elongated shape with no irregularities.

Moreover, by performing image processing on two images obtained by emitting the oblique illumination light beams from two directions, linear surface defects can be accurately detected. FIGS. 15(a) and 15(b) are diagrams for explaining images obtained by emitting oblique illumination light beams from two directions onto a linear surface defect having irregularities and onto a harmless pattern having an elongated shape with no irregularities. As illustrated in FIG. 15(a), with a linear surface defect D, the sensitivity greatly differs with respect to the irradiation direction of the oblique illumination light beams, so that the shade of the image greatly varies depending on the irradiation direction of the oblique illumination light beams. Meanwhile, as illustrated in FIG. 15(b), with a harmless pattern P having an elongated shape with no irregularities, the sensitivity does not change much with respect to the irradiation direction of the oblique illumination light beams, so that the shade of the image does not vary depending on the irradiation direction of the oblique illumination light beams. Therefore, by comparing two images of different irradiation directions of oblique illumination light beams and by capturing changes in the shade of the images using differences, ratios, and the like, the linear surface defect and the harmless pattern can be distinguished.

Figure 16:
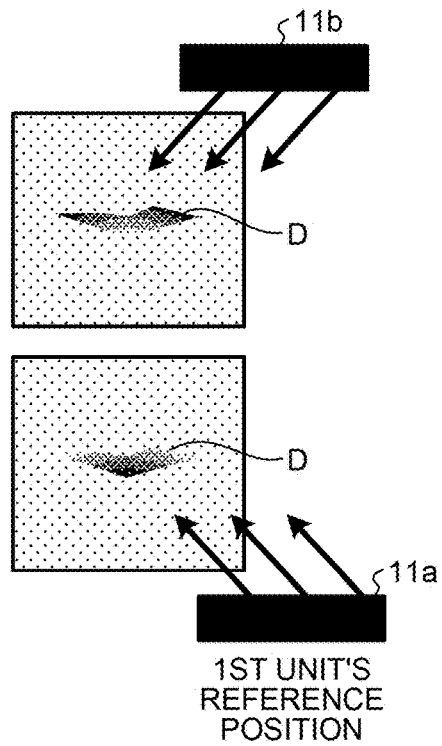
FIG. 16 is a diagram for explaining images obtained when the major axis direction of the linear surface defect is different in the same degree with respect to each of the oblique illumination light beams from two directions.

Furthermore, depending on the relation between the orientation of the linear surface defect and the irradiation direction of the oblique illumination light beams, the amount of change in the shade of the image varies even if the linear surface defect has irregularities. Out of the oblique illumination light beams from two directions, when the irradiation direction of one oblique illumination light beam is nearly parallel to and the irradiation direction of the other oblique illumination light beam is nearly perpendicular to the major axis direction of the linear surface defect, the difference in the shade of the image appears significantly. However, as illustrated in FIG. 16, for example, when the major axis direction of the linear surface defect D is different in the same degree with respect to the oblique illumination light beams from two directions, the difference in the shade of the images does not occur so much. In this case, in the case of a linear surface defect having irregularities, different shade depending on the irradiation direction of the oblique illumination light beams is generated inside the defect region, but in the case of a harmless pattern, the appearance is the same even inside the defect region, so it can be distinguished by comparing the images.

Moreover, when it is desired to efficiently distinguish the harmless pattern, it is also effective to obtain the difference between the images obtained from two directions (see Patent Literature 5). For example, in steel products, there exists a case where harmless patterns are generated on the entire surface due to the components and processes. At this time, when the defect detection by conventional threshold processing and the defect determination by image processing are attempted, the entire surface of the steel sheet is recognized as a defect candidate by the threshold processing. This causes, due to the huge number of candidate defects, problems that the inspection is not completed because the processing speed is not fast enough and that harmless signals cannot be distinguished in the subsequent image processing. Even under such conditions, by obtaining the difference between the two images obtained by irradiation from two directions, only the signals of a flat harmless pattern are removed, and the signals of a surface defect having an elongated shape that is sensitive only to one side due to irregularities or a surface defect that appears different inside the region remain by the difference processing.

When performing the foregoing difference processing, it is preferable that the light projection angle and the light-receiving angle of the two types of optical systems irradiating from two directions be equal at each position in the field of view (see Patent Literature 6). When the light projection angle and the light-receiving angle are different between the two types of optical systems, even if the target is flat, the regions having different specularity and diffusibility cannot be removed by the difference processing and remain as signals. Therefore, when performing the difference processing, it is preferable that not a pattern (arrangement A) of arranging only on the upstream side or the downstream side in the L direction as illustrated in FIG. 10 but a pattern (arrangement B) of arranging on both the upstream side and the downstream side in the L direction as illustrated in FIG. 11 be used. That is, it is preferable that the orthographic projections of the irradiation light from the upstream side and the irradiation light from the downstream side onto the surface of the steel material S be orthogonal to each other on the inspection target region that is the field of view of the line sensor, and that the light projection angle α and the irradiation angle θ of the two light sources be equal.

The steel material in the present embodiment includes steel strips, thin steel sheets, thick steel sheets, slabs, bar steels, shaped steels, hot-rolled steel sheets, or cold-rolled steel sheets.

EXAMPLE

Figure 17:
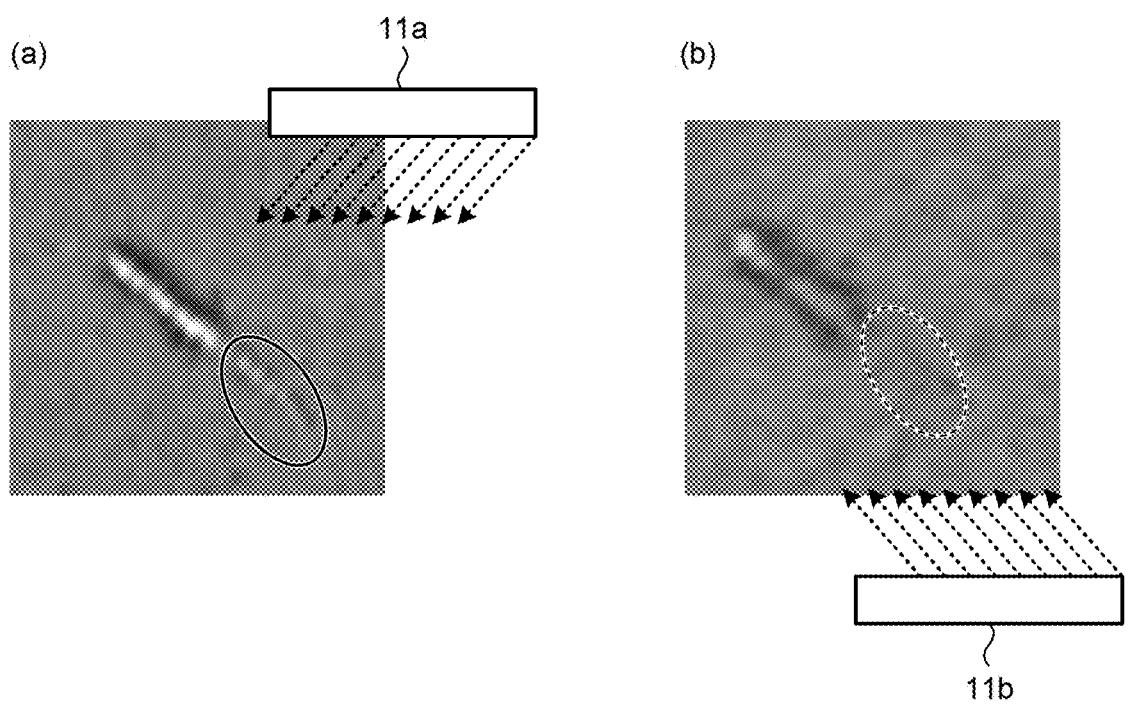
FIG. 17 is a diagram illustrating images captured when the illumination light beam was emitted from the upstream side in a transport direction and the downstream side in the transport direction and the detection results of the surface defect.

The result of actually having imaged and inspected a linear surface defect, the major axis direction of which is in any direction, is illustrated. As the optical system, the optical system of the arrangement B illustrated in FIG. 14 was used, and the light projection angles αa and αb were set to 25° and the light-receiving angles βa and βb were set to 0°. FIGS. 17(*a*) and 17(*b*) illustrate the images captured when each of the illumination light beams was emitted from the upstream side of the transport direction (L direction) of the steel material and from the downstream side of the transport direction (L direction), and the detection results of the linear surface defect. When the illumination light beam was emitted from the downstream side in the transport direction, as illustrated in FIG. 17(*b*), the detection of the surface defect portion that is circled by the broken line was difficult. Meanwhile, when the illumination light beam was emitted from the upstream side in the transport direction, as illustrated in FIG. 17(*a*), a surface defect signal of a detectable level was able to be observed at the portion circled by the solid line. Thus, according to aspects of the present invention, it has been confirmed that it is possible to detect even linear surface defects that may be overlooked due to insufficient sensitivity when emitting the oblique illumination light beam only from one side.

As in the foregoing, the embodiment to which the invention made by the present inventors was applied has been described, but the present invention is not limited by the description and drawings that form a part of the disclosure of the present invention by the present embodiment. For example, by using the surface inspection device or the surface inspection method that is one embodiment of the present invention, steel material is manufactured while detecting linear surface defects, so that the manufacturing yield of the steel material can be improved as the linear surface defects are accurately detected. Furthermore, by using the surface inspection device or the surface inspection method that is one embodiment of the present invention, the quality of steel material can be managed by classifying the steel material based on the presence or absence of linear surface defects. In other words, the manufacturing yield of the steel material can be improved as the linear surface defects are accurately detected. In addition, by using the surface inspection device or the surface inspection method that is one embodiment of the present invention, the surface of steel material manufactured by known or existing manufacturing equipment is inspected, so that the manufacturing yield of the steel material can be improved as the linear surface defects are accurately detected. Thus, other embodiments, examples, operational techniques, and the like that are made by those skilled in the art based on the present embodiment are all included in the scope of the present invention.

INDUSTRIAL APPLICABILITY

According to aspects of the present invention, a surface inspection device and a surface inspection method capable of accurately detecting a linear surface defect, the major axis direction of which can be in any direction, can be provided. In addition, according to aspects of the present invention, a method of manufacturing steel material, a method of managing quality of steel material, and a manufacturing facility for steel material capable of improving manufacturing yield of the steel material as a linear surface defect, the major axis direction of which can be in any direction, is accurately detected can be provided.

REFERENCE SIGNS LIST

1 IMAGING UNIT
2 LIGHT SOURCE
10 SURFACE INSPECTION DEVICE
11*a*, 11*b* OBLIQUE LINE LIGHT SOURCE
12 LINE SENSOR, COLOR LINE SENSOR
13 DETECTION UNIT
D LINEAR SURFACE DEFECT
S STEEL MATERIAL
L1 OBLIQUE ILLUMINATION LIGHT BEAM FROM OBLIQUE LINE LIGHT SOURCE 11*a*
L2 OBLIQUE ILLUMINATION LIGHT BEAM FROM OBLIQUE LINE LIGHT SOURCE 11*b* (NOT ILLUSTRATED)
L1' OBLIQUE ILLUMINATION LIGHT BEAM COMPONENT OBTAINED BY ORTHOGRAPHICALLY

PROJECTING OBLIQUE ILLUMINATION LIGHT BEAM FROM OBLIQUE LINE LIGHT SOURCE 11a ONTO SURFACE OF STEEL MATERIAL S

L2' OBLIQUE ILLUMINATION LIGHT BEAM COMPONENT OBTAINED BY ORTHOGRAPHICALLY PROJECTING OBLIQUE ILLUMINATION LIGHT BEAM (NOT ILLUSTRATED) FROM OBLIQUE LINE LIGHT SOURCE 11b ONTO SURFACE OF STEEL MATERIAL S

θ IRRADIATION DIRECTION (WHEN ORTHOGRAPHICALLY PROJECTED ONTO SURFACE OF STEEL MATERIAL), ILLUMINATION ANGLE (WHEN ORTHOGRAPHICALLY PROJECTED ONTO SURFACE OF STEEL MATERIAL)

θa, θb ILLUMINATION ANGLE (WHEN ORTHOGRAPHICALLY PROJECTED ONTO SURFACE OF STEEL MATERIAL)

α, αa, αb LIGHT PROJECTION ANGLE

β, βa, βb LIGHT-RECEIVING ANGLE

ξa, ξb OBLIQUE LIGHT ANGLE

γ INSTALLATION ANGLE OF ONE LINEAR POLARIZING PLATE (UNIT: °)

ω INCLINATION OF ONE OBLIQUE IRRADIATION LIGHT WITH RESPECT TO AXIAL DIRECTION OF OBLIQUE LINE LIGHT SOURCE (UNIT: °)

ψ INCLINATION OF THE OTHER OBLIQUE ILLUMINATION LIGHT BEAM WITH RESPECT TO AXIAL DIRECTION OF OBLIQUE LINE LIGHT SOURCE (UNIT: °)

The invention claimed is:

1. A surface inspection device comprising:
two or more oblique line light sources configured to emit oblique illumination light beams onto a same inspection target region of steel material;
one or more line sensors configured to receive each of reflected light beams of the oblique illumination light beams from the respective oblique line light sources, the reflected light beams being from the inspection target region for each oblique line light source, and to capture images; and
a detector configured to detect a linear surface defect at the inspection target region using the images captured by the one or more line sensors, wherein
orthographic projections of at least two oblique illumination light beams, out of the oblique illumination light beams from the two or more oblique line light sources, onto a surface of the steel material are orthogonal to each other on the inspection target region, and
the two or more oblique line light sources are configured to emit the oblique illumination light beams in a direction oblique to a transport direction of the steel material.

2. The surface inspection device according to claim 1, wherein at least one oblique line light source out of the two or more oblique line light sources is installed, within a field of view of the line sensors, on an upstream side in a transport direction or on a downstream side in the transport direction of the steel material with respect to the inspection target region.

3. A method of manufacturing steel material, the method comprising a step of manufacturing steel material while detecting linear surface defects of the steel material using the surface inspection device according to claim 2.

4. A method of managing quality of steel material, the method comprising a step of managing quality of steel material by classifying steel material based on a presence or absence of linear surface defects using the surface inspection device according to claim 2.

5. A manufacturing facility for steel material, comprising:
the surface inspection device according to claim 2; and
the manufacturing facility for steel material, wherein
the surface inspection device is configured to inspect a surface of steel material manufactured by the manufacturing facility for steel material.

6. The surface inspection device according to claim 1, wherein
at least one oblique line light source out of the two or more oblique line light sources is installed, within a field of view of the line sensors, on an upstream side in a transport direction of the steel material with respect to the inspection target region, and
at least one oblique line light source out of the two or more oblique line light sources is installed, within the field of view of the line sensors, on a downstream side in the transport direction of the steel material with respect to the inspection target region.

7. A method of manufacturing steel material, the method comprising a step of manufacturing steel material while detecting linear surface defects of the steel material using the surface inspection device according to claim 3.

8. A method of managing quality of steel material, the method comprising a step of managing quality of steel material by classifying steel material based on a presence or absence of linear surface defects using the surface inspection device according to claim 3.

9. A manufacturing facility for steel material, comprising:
the surface inspection device according to claim 3; and
the manufacturing facility for steel material, wherein
the surface inspection device is configured to inspect a surface of steel material manufactured by the manufacturing facility for steel material.

10. A method of manufacturing steel material, the method comprising a step of manufacturing steel material while detecting linear surface defects of the steel material using the surface inspection device according to claim 1.

11. A method of managing quality of steel material, the method comprising a step of managing quality of steel material by classifying steel material based on a presence or absence of linear surface defects using the surface inspection device according to claim 1.

12. A manufacturing facility for steel material, comprising:
the surface inspection device according to claim 1; and
the manufacturing facility for steel material, wherein
the surface inspection device is configured to inspect a surface of steel material manufactured by the manufacturing facility for steel material.

13. The surface inspection device according to claim 1, wherein the at least two oblique illumination light beams are emitted from different angles.

14. A surface inspection method comprising:
an irradiating step of emitting oblique illumination light beams onto a same inspection target region of steel material using two or more oblique line light sources;
an imaging step of receiving each of reflected light beams of the oblique illumination light beams from the respective oblique line light sources, the reflected light beams being from the inspection target region for each oblique line light source, and capturing images of the inspection target region, by one or more line sensors; and a detecting step of detecting a linear surface defect at the inspection target region using the images captured at the imaging step, wherein orthographic projections of at least two oblique illumination light beams, out of the oblique illumination light beams from the two or more oblique line light sources, onto a surface of the steel material are orthogonal to each other on the inspection target region, and the two or more oblique line light sources are configured to emit the oblique illumination light beams in a direction oblique to a transport direction of the steel material.

* * * * *